US011409465B2

(12) United States Patent
Nimmagadda et al.

(10) Patent No.: US 11,409,465 B2
(45) Date of Patent: Aug. 9, 2022

(54) SYSTEMS AND METHODS FOR MANAGING COMMUNICATION BETWEEN NVME-SSD STORAGE DEVICE(S) AND NVME-OF HOST UNIT

(71) Applicant: SAMSUNG ELECTRONICS CO., LTD., Suwon-si (KR)

(72) Inventors: Venkataratnam Nimmagadda, Karnataka (IN); Anil Desmal Solanki, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 16/704,206

(22) Filed: Dec. 5, 2019

(65) Prior Publication Data

US 2020/0225874 A1 Jul. 16, 2020

(51) Int. Cl.
*G06F 3/06* (2006.01)
*G06F 15/173* (2006.01)
*G06F 13/42* (2006.01)

(52) U.S. Cl.
CPC .......... *G06F 3/0659* (2013.01); *G06F 3/0604* (2013.01); *G06F 3/067* (2013.01); *G06F 3/0656* (2013.01); *G06F 13/4282* (2013.01); *G06F 15/17331* (2013.01); *G06F 2213/0026* (2013.01)

(58) Field of Classification Search
CPC .... G06F 3/0659; G06F 3/0604; G06F 3/0656; G06F 3/067; G06F 13/4282; G06F 15/17331; G06F 2213/0026; G06F 13/12; G06F 13/404
See application file for complete search history.

(56) References Cited

U.S. PATENT DOCUMENTS 9,934,173 B1\* 4/2018 Sakalley ............. G06F 13/4068

\* cited by examiner

*Primary Examiner* — Idriss N Alrobaye
*Assistant Examiner* — Richard B Franklin
(74) *Attorney, Agent, or Firm* — Volentine, Whitt & Francos, PLLC

(57) ABSTRACT

A system manages communication between a non-volatile memory express-over fabric (NVMe-oF) host unit and multiple non-volatile memory express-solid state drive (NVMe-SSD) storage devices via a bridge unit. The bridge unit may include sub-modules to control operations. The bridge unit may generate a virtual data memory address corresponding to a scattered gathered list address. The bridge unit may not require a data buffer to store intermediate data. The system may be configured to initiate a memory WRITE/READ transaction to access a virtual data memory corresponding to a physical memory in the bridge unit for performing a data WRITE/READ operation by an NVMe-SSD storage device.

18 Claims, 13 Drawing Sheets

SYSTEMS AND METHODS FOR MANAGING COMMUNICATION BETWEEN NVME-SSD STORAGE DEVICE(S) AND NVME-OF HOST UNIT

CROSS-REFERENCE TO RELATED APPLICATIONS

This U.S. non-provisional patent application claims the benefit of priority under 35 U.S.C. § 119 to Indian Patent Application No. 201941001145, filed on Jan. 10, 2019 in the Indian Intellectual Property Office, the entire contents of which are incorporated herein by reference.

BACKGROUND

1. Technical Field

The present disclosure relates to the field of storage devices. More particularly, the present disclosure relates to systems and methods for managing communication between a non-volatile memory express-over fabric (NVMe-oF) host unit and multiple non-volatile memory express-solid state drive (NVMe-SSD) storage devices via a bridge unit.

2. Discussion of Related Art

In general, a computing system may include a processing unit, a bus-based interconnect such as a peripheral component interconnect express (PCIe) interconnect, and input-output controllers to interface the processing unit to various devices such as storage devices, network devices and graphics devices. For example, storage drivers can be used as input-output controllers to interface storage devices associated with the computing system and the processing unit. The storage drivers may be configured to receive at least one of a command and data from the processing unit and forward the command and/or data over a serial link or a parallel link to the storage devices. In similar manner, the storage drivers may also receive a response to the command and/or data from the storage device over the serial link or parallel link and may transmit the response to the processing unit.

The storage drivers can be NVMe-oF (non-volatile memory express-over fabric) storage drivers and may issue commands over fabrics such as ethernet. NVMe is a specific device interface specification for accessing storage devices via a PCIe bus. Thus, the storage devices can be PCIe-based NVMe-SSD (non-volatile memory express-solid state drive) storage devices. NVMe-oF is a specific specification defining an architecture for NVMe message-based commands (NVMe block storage protocol) to transfer data between a host computer and a SSD or a system of SSDs over a fabric networks such as ethernet, fibre channel (FC) or InfiniBand. Further, to establish data communication between an NVMe-oF host unit and NVMe-SSD storage devices, a bridge unit may be required to manage protocol translations between the NVMe-oF host unit and NVMe-SSD storage devices, i.e., in addition to the NVMe-oF storage drivers.

A conventional bridge unit that may require additional memory such as specifically dedicated memories (e.g., buffers) for managing the data transfer between a NVMe-oF host unit and NVMe-SSD(s) will be described referring to FIGS. 1a to 1d as follows.

FIG. 1a illustrates a block diagram of conventional bridge unit. The conventional bridge unit may enable communication between the NVMe-oF host unit and the NVMe-SSD storage device, as shown in the FIG. 1a. For example, the conventional bridge unit may allow the protocol conversions between NVMe-oF to NVMe and from NVMe to NVMe-oF. The conventional bridge unit in FIG. 1A includes a processor, a submission queue buffer, an in-capsule write data buffer, a completion queue buffer, a read/write data buffer, a NIC (network inter connect), an RDMA (remote direct memory access) sub-module, a NVMeoF-NVMe sub-module and a root complex (RC) sub-module. The NVMe-SSD may need an allocation of buffer before a command is received. The read/write data buffer can be used for storing intermediate data to execute the translation from NVMe-oF read/write commands from the NVMe-oF host unit to NVMe for the NVMe-SSD storage device, and from NVMe read/write data/responses from the NVMe-SSD storage device to NVMe-oF for the NVMe-oF host unit. The submission queue (SQ) buffer may be used to store the command from the NVMe-oF host unit, before posting the command to a PCIe-based NVMe-SSD storage device. The completion queue (CQ) buffer may be used to store the response from the PCIe-based NVMe-SSD storage device, before posting the response to the NVMe-oF host unit. The processor may be used for handling the administration/management of NVMe-oF commands and interrupts. The in-capsule write data buffer may be used for storing the data associated with an in-capsule NVMe-oF write command received from the NVMe-oF host unit. The remote direct memory access (RDMA) sub-module may be used for transmitting the data between the NVMe-oF host unit and conventional fabrics such as ethernet. The NVMeoF-NVMe sub-module may be used for protocol conversion or buffer management. The root complex (RC) sub-module may be used for transmitting the data between the conventional bridge unit and the NVMe-SSD storage device via PCIe.

As described above, the conventional bridge unit in FIG. 1a includes at least four separate dedicated buffers including the submission queue buffer, the in-capsule write data buffer, the completion queue buffer and the read/write data buffer. As explained for FIGS. 1b to 1d, various of these dedicated buffers are specifically used for some functions such as for a completion queue flow, a read flow and a write flow.

FIG. 1b illustrates a sequence diagram of a completion queue (CQ) flow in the conventional bridge unit. At a first step, the storage device (i.e. the NVMe-SSD) may post the completion entry (CE) to the CQ Area associated with the CQ buffer. At a second step, a message signal interrupt (MSI-X) may be generated by the NVMe-SSD storage device and the message signal interrupt may be provided to the processor. At a third step, the processor may identify the CE posted by the NVMe-SSD storage device in the CQ buffer. Further, the processor may also search a phase bit in the CE. At a fourth step, if required, the processor may modify the CE in the CQ buffer. At a fifth step, the processor may indicate that a pending CE is in the associated CQ buffer, to the NVMeoF-NVMe sub-module. At a sixth step, the NVMeoF-NVMe sub-module may fetch the pending completion entry (PCE) from the associated CQ buffer. At a seventh step, the NVMeoF-NVMe sub-module may generate an RDMA SEND packet via the RDMA sub-module and transmit the RDMA SEND packet to the NVMe-oF host unit. At an eighth step, the NVMeoF-NVMe sub-module may update a completion queue head doorbell (CQHD) in the NVMe-SSD storage device.

FIG. 1c illustrates a sequence diagram of a NVMe-oF read flow in the conventional bridge unit. At a first step, the NVMe-oF host unit may transfer a NVMe-oF READ command as an RDMA SEND packet to the conventional bridge unit. At a second step, the NVMeoF-NVMe sub-module may allocate a read buffer in the read/write data buffer and may map one or more scattered gathered list (SGL) address(es) of the READ command to the allocated read buffer address. Further, the NVMeoF-NVMe sub module may update the READ command along with a modified SGL field in the SQ buffer. Further, the NVMeoF-NVMe sub-module may store context information such as queue number (QN), NVMe-oF command ID, remote KEY (i.e. KEY fields for all the SGL addresses associated with the NVMeoF command), and address fields for all the SGL addresses associated with the NVMeoF command, for the READ command. At a third step, the NVMeoF-NVMe sub-module may ring a submission queue tail doorbell (SQTD) of the NVMe-SSD storage device through the root complex (RC) sub-module via PCIe. At a fourth step, the NVMe-SSD may fetch the SQE from the SQ buffer via PCIe. At a fifth step, the NVMe-SSD may initiate a PCIe memory WRITE transaction layer packet (TLP) transaction. Further, the NVMe-SSD may write the data associated with the READ command in the allocated read buffer associated with the read/write data buffer. At a sixth step, the NVMe-SSD storage device may post the CE in the CQ buffer after writing the complete data associated with the READ command, in the allocated read buffer associated with the read/write data buffer. At a seventh step, the message signal interrupt (MSI-X) may be generated by the NVMe-SSD storage device and the interrupt may be provided to the processor associated with the conventional bridge unit. At an eighth step, the processor may identify the CE posted in the CQ buffer by searching for the phase bit in CE. Further, if required, the processor may modify the CE in the CQ buffer. At a ninth step, the processor may trigger the NVMeoF-NVMe sub-module for transmitting data from the read/write data buffer associated with the conventional bridge unit to the NVMe-oF host unit. The NVMeoF-NVMe sub-module may receive the context information associated with the READ command corresponding to the data that is to be transferred to the NVMe-oF host unit. At a tenth step, the NVMeoF-NVMe sub-module may read the data from the allocated read buffer in the read/write data buffer. At an eleventh step, the NVMeoF-NVMe sub-module may form the RDMA WRITE packet and transmit the RDMA WRITE packet to the NVMe-oF host unit. At a twelfth step, the NVMeoF-NVMe sub-module may fetch the CE after transmitting the complete data to the NVMe-oF host unit. At a thirteenth step, the NVMeoF-NVMe sub-module may form an RDMA SEND packet and may transmit the RDMA SEND packet to the NVMe-oF host unit via fabrics. At a fourteenth step, the NVMeoF-NVMe sub-module may update the completion queue head doorbell (CQHD) associated with the NVMe-SSD storage device via PCIe and may de-allocate the read buffer in the read/write data buffer.

FIG. 1d illustrates a sequence diagram of a conventional NVMe-oF write flow in the conventional bridge architecture. At a first step, the NVMe-oF host unit may transfer an NVMe-oF write command as an RDMA SEND packet to the conventional bridge unit. At a second step, the NVMeoF-NVMe sub-module may allocate write buffer address(es) in the read/write data buffer and may map the scattered gathered list (SGL) address(es) of the NVMe-oF write command to the allocated write buffer address(es). Further, the NVMeoF-NVMe sub-module may update the NVMe-oF write command with a modified SGL field in the SQ buffer. Further, the NVMeoF-NVMe sub-module may store context information such as queue number (QN), NVMe-oF command ID, remote KEY (i.e. KEY fields for all the SGL addresses associated with the NVMeoF command), address fields for all the SGL addresses associated with the NVMe-oF command, for the NVMe-oF write command. At a third step, the NVMeoF-NVMe sub-module may initiate an RDMA READ request. At a fourth step, the NVMe-of host unit may respond with an RDMA READ response. At a fifth step, the NVMeoF-NVMe sub-module may write the data into the allocated write buffer address(es) based on the received RDMA READ response. At a sixth step, the NVMeoF-NVMe sub-module may ring a submission queue tail doorbell (SQTD) of the NVMe-SSD storage device via PCIe based on fetching complete data for the write command from the NVMe-oF host unit over fabrics and after writing into the allocated write buffer address(es) in the read/write data buffer. At a seventh step, the NVMe-SSD storage device may fetch the SQE from the SQ buffer. At an eighth step, the NVMe-SSD storage device may initiate a PCIe memory READ transaction layer packet (TLP) transaction. At a ninth step, the NVMe-SSD storage device may post the CE in the associated CQ buffer after reading the data associated with the complete write command from the allocated write buffer in the read/write data buffer. At a tenth step, the Message Signal Interrupt (MSI-X) may be generated by the NVMe-SSD storage device and an MSI-X interrupt is generated to the processor. At an eleventh step, if required, the processor may modify the completion entry and update the CQ area associated with the CQ buffer. At a twelfth step, the processor may indicate a corresponding pending completion entry (PCE) in the CQ buffer, to the NVMeoF-NVMe sub-module. At a thirteenth step, the NVMeoF-NVMe sub-module may fetch the pending completion entry (PCE) from the CQ buffer. Further, the NVMeoF-NVMe sub-module may form an RDMA SEND packet and may transmit the RDMA SEND packet to the NVMe-oF host unit over fabrics. At a fourteenth step, the NVMeoF-NVMe sub-module may update the CQHD in the NVMe-SSD storage device via PCIe and may de-allocate the write buffer in the read/write data buffer.

In addition to the heavy reliance on at least four dedicated buffers described above, the conventional bridge architecture may automatically transmit completion of a write command to the NVMe-oF host unit without transmitting the data corresponding to the write command to the NVMe-SSD storage device via PCIe. Further still, to support auto-completion of a write command, the conventional bridge architecture may have an additional processor for running an NVMe-oF device driver and an NVMe host driver, large capacitance for managing power loss, a hazard filter; and a full fledged data integrity field/data integrity plus extensions (DIF/DIX) end to end (E2E) feature support. As such, the conventional bridge unit in FIG. 1a has complex flows, relatively large power consumption due in part to the numerous elements and complex flows, unnecessarily high costs and excessive size in order to realize communications between the NVMe-oF host unit and the NVMe-SSD storage devices.

SUMMARY

The embodiments herein describe systems and methods for managing communication between a NVMe-oF host unit and multiple NVMe-SSD storage devices via a bridge unit.

Embodiments herein also describe a method for providing a virtual buffer memory for managing intermediate data.

Embodiments herein also describe a method for reducing latency.

Embodiments herein also describe a method for reducing large memory requirements and associated power.

Accordingly, the embodiments herein provide a method for managing communication between a NVMe-oF host unit and multiple NVMe-SSD storage devices via a bridge unit. The method includes receiving, by the bridge unit, a NVMe-oF data transfer command comprising a scattered gathered list (SGL) address, from the NVMe-oF host unit to perform at least one action. The method includes generating, by the bridge unit, a virtual data memory address of a virtual data memory, corresponding to the SGL address, based on the at least one action to be performed. The virtual data memory corresponds to a physical memory in the bridge unit. The method includes storing, by the bridge unit, the NVMe-oF data transfer command as a submission queue entry (SQE) in a submission queue (SQ) buffer and storing context information associated with the NVMe-oF data transfer command in a context memory in a NVMeoF-NVMe sub-module. The method includes obtaining, by a NVMe-SSD storage device among the multiple NVMe-SSD storage devices, the SQE stored in the SQ buffer. The method includes accessing, by the NVMe-SSD storage device, the virtual data memory corresponding to the physical memory in the bridge unit, based on the SQE obtained from the SQ buffer by initiating at least one of a PCIe (peripheral component interconnect express) memory WRITE transaction layer packet (TLP) transaction and a PCIe memory READ TLP transaction. The method includes translating, by the bridge unit, at least one of the PCIe memory READ TLP transaction and the PCIe memory WRITE TLP transaction, received from the NVMe-SSD Storage device, to one of a remote direct memory access (RDMA) READ packet and a RDMA WRITE packet, based on the stored context information stored in the context memory. The method includes transmitting, by the bridge unit, via fabric to the NVMe-oF host unit, at least one of the RDMA WRITE packet translated by the bridge unit and the RDMA READ packet translated by the bridge unit.

Accordingly, the embodiments herein provide a system for managing communication between a NVMe-oF host unit and multiple NVMe-SSD storage devices via a bridge unit. The system is configured to receive, by the bridge unit, a NVMe-oF data transfer command comprising a scattered gathered list (SGL) address, from the NVMe-oF host unit to perform at least one action. The system is configured to generate, by the bridge unit, a virtual data memory address, corresponding to the SGL address, based on the at least one action to be performed. The virtual data memory corresponds to a physical memory in the bridge unit. The system is configured to store, by the bridge unit, the NVMe-oF data transfer command as a submission queue entry (SQE) in a submission queue (SQ) buffer and store context information associated with the NVMe-oF data transfer command in a context memory in a NVMeoF-NVMe sub-module. The system is configured to obtain, by a NVMe-SSD storage device among the multiple NVMe-SSD storage devices, the SQE stored in the SQ buffer. The system is configured to access, by the NVMe-SSD storage device, the virtual data memory corresponding to the physical memory in the bridge unit, based on the SQE obtained from the SQ buffer by initiating at least one of a PCIe memory WRITE transaction layer packet (TLP) transaction and a PCIe memory READ TLP transaction. The system is configured to translate, by the bridge unit, at least one of the PCIe memory READ TLP transaction and the PCIe memory WRITE TLP transaction, received from the NVMe-SSD Storage device, to one of a remote direct memory access (RDMA) READ packet and a RDMA WRITE packet, based on the context information in the context memory. The system is configured to transmit, by the bridge unit, via fabric to the NVMe-oF host unit, at least one of the RDMA WRITE packet translated by the bridge unit and the RDMA READ packet translated by the bridge unit.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
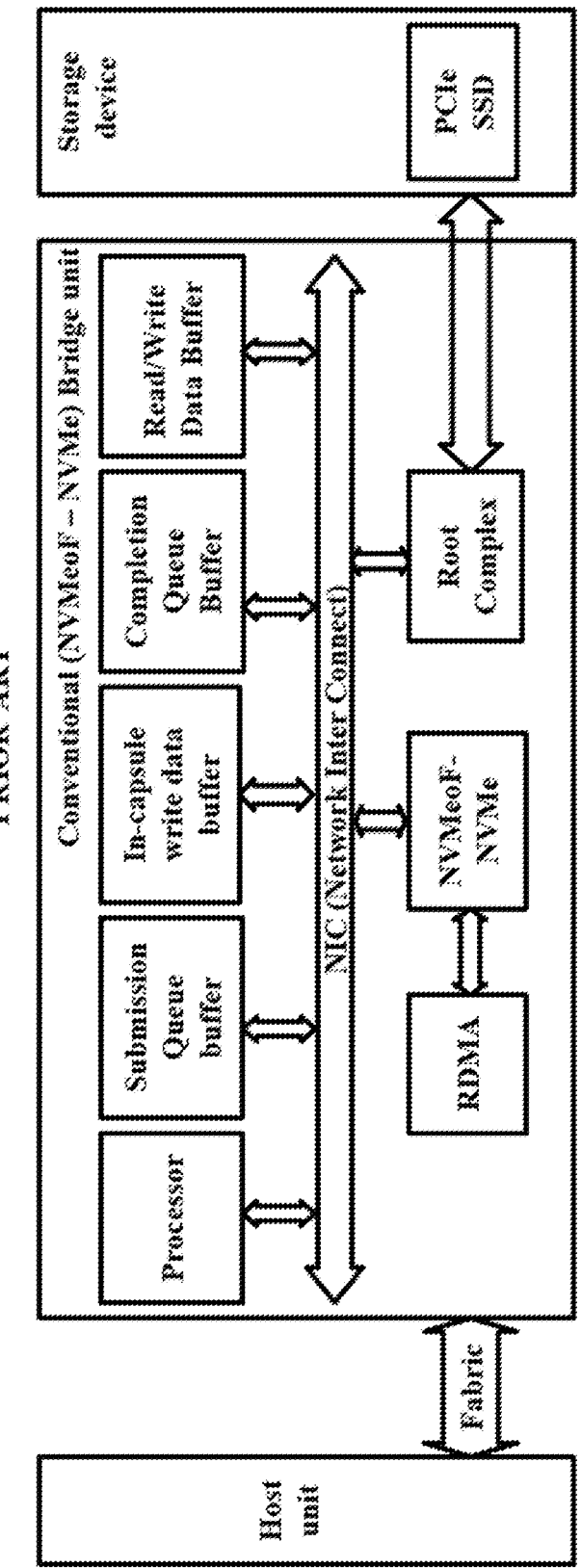
FIG. 1a illustrates a block diagram of a conventional bridge unit.
Figure 1B:
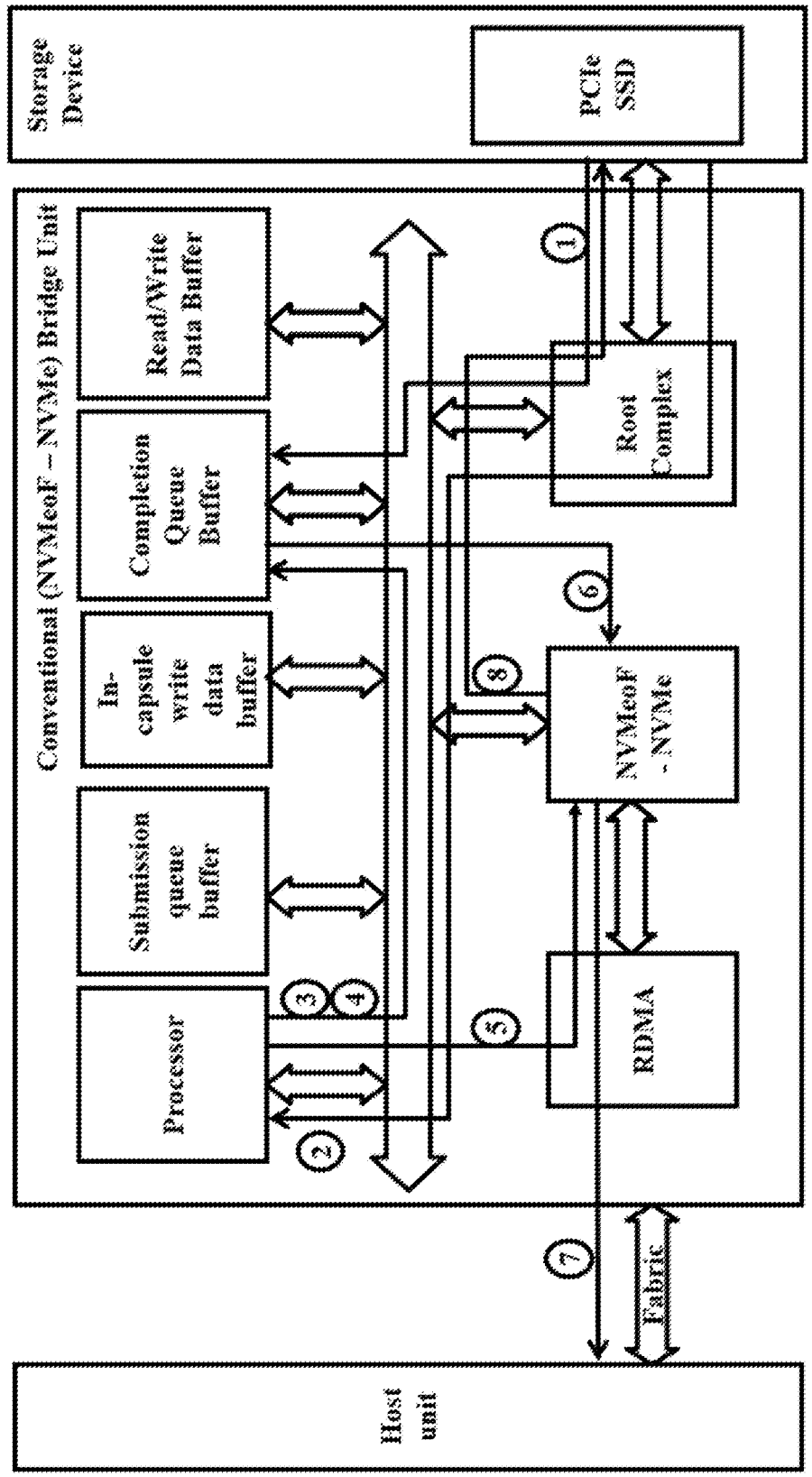
FIG. 1b illustrates a sequence diagram of completion queue (CQ) flow in the conventional bridge unit.
Figure 1C:
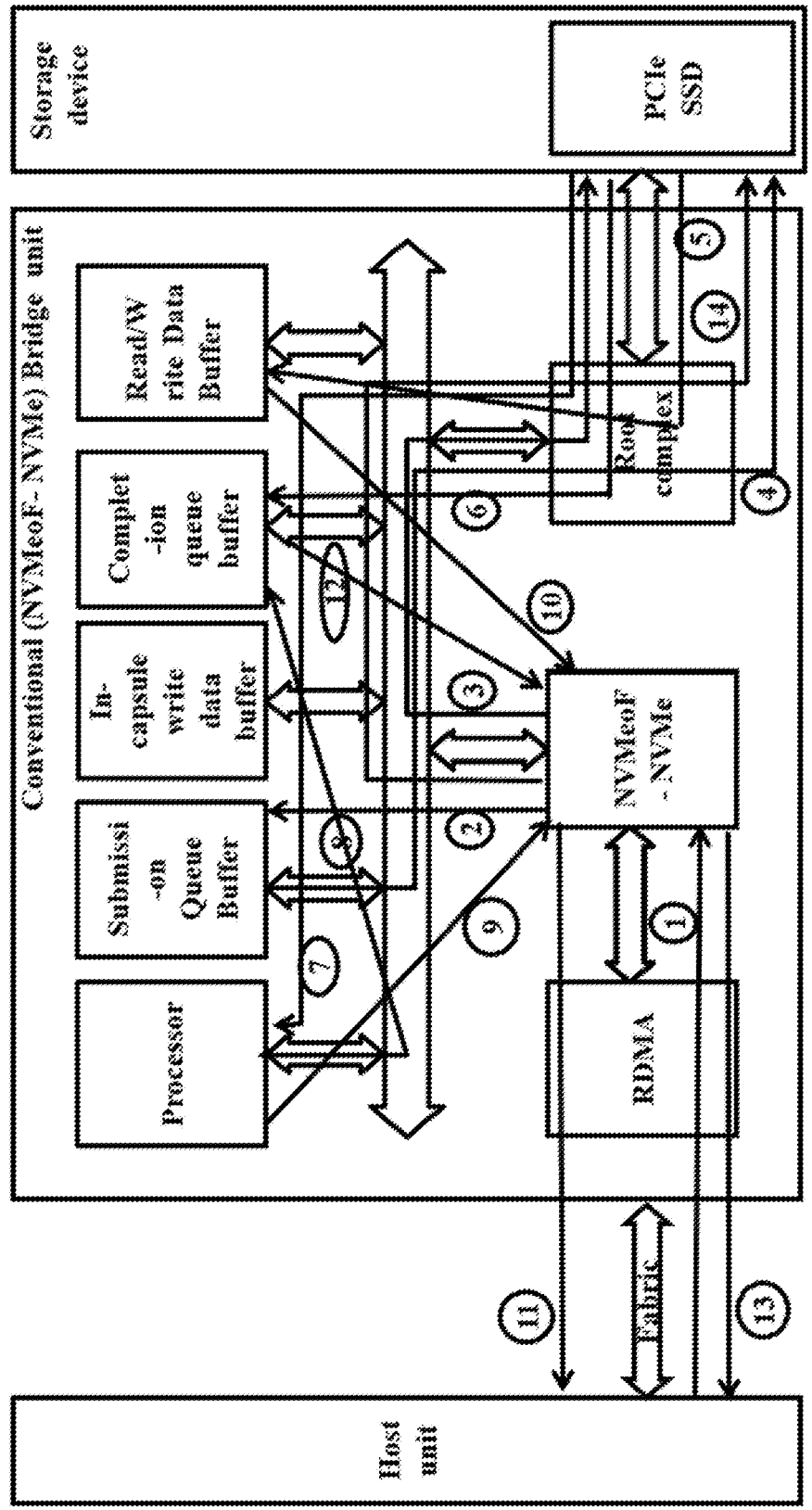
FIG. 1c illustrates a sequence diagram of NVMe-oF read flow in the conventional bridge unit.
Figure 1D:
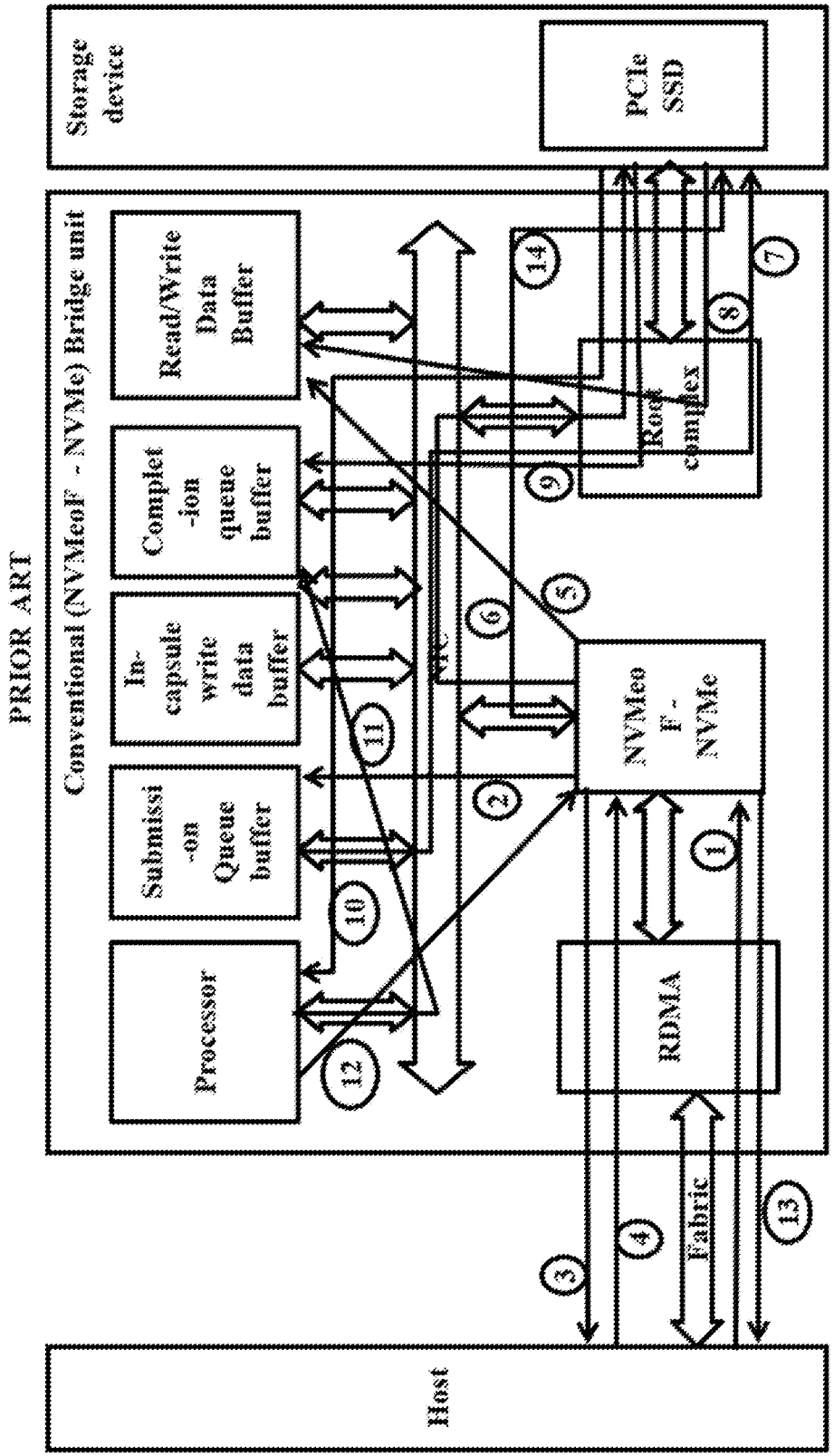
FIG. 1d illustrates a sequence diagram of NVMe-oF write flow in the conventional bridge unit.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve systems and methods for managing communication between a NVMe-oF host unit and multiple NVMe-SSD storage devices via a bridge unit, by providing a virtual buffer. Referring now to the drawings, and more particularly to FIGS. 2a through 3e, where similar reference characters denote corresponding features consistently throughout the figures, there are shown example embodiments.

Figure 2A:
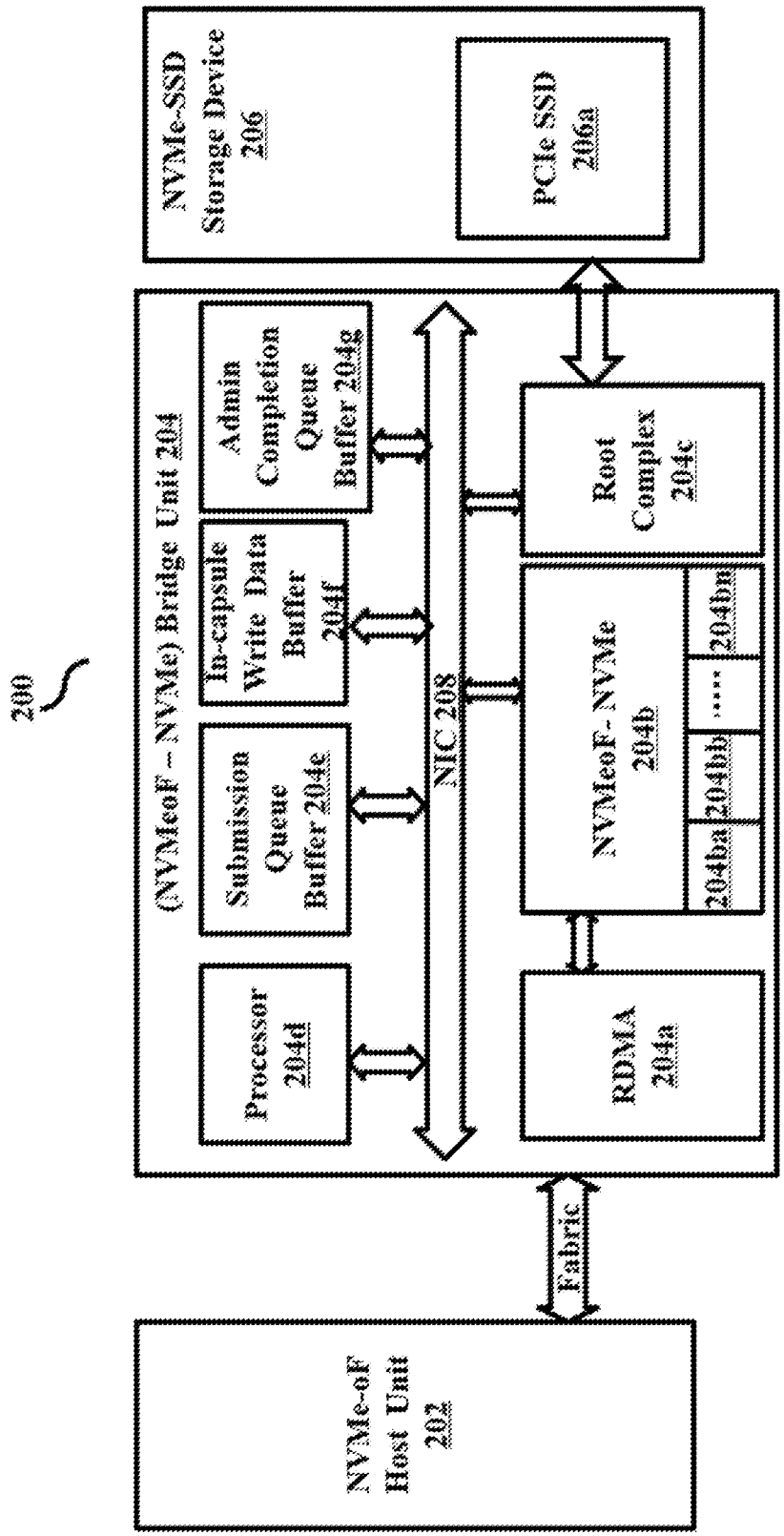
FIG. 2a illustrates a block diagram of a system that includes a bridge unit according to embodiments as disclosed herein.

FIG. 2a illustrates a block diagram of a system that includes a bridge unit according to embodiments as disclosed herein. The system 200 may include an NVMe-oF host unit 202, a bridge unit 204 and a NVMe-SSD storage device 206. The NVMe-SSD storage device 206 may also include a controller (not shown) and a non-volatile memory (NVM) device such as, for example, a flash memory device, and so on. The NVMe-SSD storage device 206 may be at least one of, but not limited to, a flash-based solid state drive (SSD), a Phase Change Random Access memory (PRAM)-based SSD, a Resistive Random Access memory (RRAM)-based SSD, and so on. The NVMe-SSD storage device 206 may include at least one of a processor (not shown), a non-volatile memory (NVM), and a volatile memory. The NVMe-oF host unit 202 can be at least one of, but not limited to, a server, a desktop computer, a hand-held device, a multiprocessor system, a microprocessor-based programmable consumer electronics, a laptop, a network computer, a minicomputer, a mainframe computer, and so on.

In the system 200, the NVMe-oF host unit 202 may communicate with the bridge unit 204 using a fabrics interface protocol such as Ethernet fabrics. The fabrics interface protocol may also include at least one of, but not limited to, a fiber Channel, and so on. The bridge unit 204 may communicate with the NVMe-SSD storage device 206 using an interface protocol such as PCIe. The PCIe SSD 206a may communicate with the bridge unit 204 using the PCIe bus interface protocol. The interface protocol may also include at least one of, but not limited to, an Advanced Technology Attachment (ATA), a Serial ATA (SATA), a Parallel ATA (PATA), a Serial Attached Small Computer System Interface (SAS), and so on. Further, the bridge unit 204 may include sub-modules such as a remote direct memory access (RDMA) sub-module 204a, an NVMeoF-NVMe sub-module 204b, a Root Complex (RC) sub-module 204c, a processor 204d, a SQ buffer 204e (submission queue buffer), an in-capsule write data buffer 204f and an ACQ buffer 204g (admin completion queue buffer). The NVMeoF-NVMe sub-module 204b may include sub-modules including at least one of, but not limited to, a virtual data memory 204ba, and a context memory 204bb through a context memory 204bn. The SQ buffer 204e may include a command set such as at least one of, but not limited to, an ASQ command (administrative (Admin) submission queue command) and an IOSQ command (input/output submission queue(s) command), associated with a controller(s) of the bridge unit 204.

References herein to a virtual memory or a virtual data memory 204ba are to a virtual data memory corresponding to a physical memory in the bridge unit 204, such as in the NVMeoF-NVMe sub-module 204b. However, the virtual memory may mean that memory locations in the virtual memory may be virtualized so as not to be necessarily dedicated at all times to the same task or set of tasks. In other words, a physical memory location that is subject to virtualization may be used for one take or set of tasks at one time, and a different task or set of tasks at another. Additionally, a task or set of tasks using virtual memory locations may be distributed among different individual virtual memory locations that are not physically adjacent to one another.

The ACQ buffer 204g may include a completion entry(s) corresponding to the admin queue received from the NVMe-SSD storage device 206. The admin submission queue (ASQ) and a subsequent admin completion queue (ACQ) can be used to submit administrative (Admin) commands and receive completions corresponding to the administrative (Admin) commands, respectively. The non-volatile memory device can be the NVMe-SSD storage device 206 to store data in a non-volatile state. Furthermore, the NVMe-oF host unit 202 may transmit a submission queue entry (SQE) to the bridge unit 204 over fabrics through the RDMA sub-module 204a using an RDMA SEND operation.

In an embodiment, the bridge unit 204 in the system 200 may be configured to receive from the NVMe-oF host unit 202 a NVMe-oF connect command for admin queue. Further, based on receiving the NVMe-oF connect command, the bridge unit 204 may form an association with the NVMe-SSD storage device 206. Further, a base address of an Admin SQ associated with the SQ buffer 204e may be configured in the ASQ base address register (admin submission queue base address register) of the NVMe-SSD storage device 206. Furthermore, a base address of an Admin CQ associated with the ACQ buffer 204g may be configured in an ACQ base address register (admin completion queue base address register) of the NVMe-SSD storage device 206. Also, size information of the queues such as ASQ and ACQ is provided in an admin queue attributes (AQA) register of the NVMe-SSD storage device 206.

Further, the bridge unit 204 may transmit a Completion Entry (CE) corresponding to the admin queue associated with the NVMe-oF connect command, to the NVMe-oF host unit 202 through RDMA sub-module 204a using the RDMA SEND operation. Further, an IOCQ command (input/output completion queue command) and an IOSQ command corresponding to the input/output queue (IOQ) may be created. The physical buffer for the IOSQ command may be allocated in the SQ buffer 204e by the bridge unit 204 and the physical address may be placed in a base address field of a CREATE IOSQ command. A virtual buffer for the subsequent IOCQ may be allocated by the bridge unit 204 and the virtual address may be placed in the base address field of the CREATE IOCQ command. In an example, the virtual IOCQ base address can be described as follows:

Virtual IOCQ base address={"Base address of NVMeoF-NVMe sub-module 204b in the bridge unit 204", "Tag_bit (i.e. 1'b0)", "Queue_Number (i.e. [7:0], PCIe bus, PCIe device, PCIe function, 22'h0)"}

In an embodiment, a physical buffer is allocated for the admin CQ in the ACQ buffer 204g, as interaction of/by the processor 204d may be involved for admin related commands. In an embodiment, the bridge unit 204 may ring a doorbell of the NVMe-SSD storage device 206 to create at least one of the IOSQ command and the IOCQ command, based on receiving the NVMe-oF connect corresponding to the IO queue from the NVMe-oF host unit 202. When the completions for both the CREATE IOSQ command and the CREATE IOCQ command are received from the NVMe-SSD storage device 206, the bridge unit 204 may transmit, to the NVMe-oF host unit 202 through the RDMA sub-module 204*a* using a RDMA SEND operation, a Completion Entry (CE) corresponding to the NVMe-oF connect command associated with the IO queue.

In an embodiment, the system 200 may be configured to receive, by the bridge unit 204, a NVMe-oF data transfer command along with a scattered gathered list (SGL) address, from the NVMe-oF host unit 202, to perform at least one action. The NVMe-oF data transfer command may include at least one of an Admin command and an input/output (TO) command. In an embodiment, the bridge unit 204 of the system 200 may be configured to generate a virtual data memory address of a virtual data memory 204*ba*, corresponding to the SGL address(es) in the NVMe-oF data transfer command received from the NVMe-oF host unit 202, based on the action to be performed. In an embodiment, the generated virtual data memory address of the virtual data memory 204*ba* may be embedded in the SGL field of the SQE, stored in the SQ buffer 204*e* associated with the bridge unit 204. In an embodiment, context information may be stored in a context memory 204*bb* by the bridge unit 204 based on the command received by the bridge unit 204 from the NVMe-oF host unit 202. Context information stored in the context memory 204*bb* may include at least one of Remote KEY (i.e. KEY fields for the SGL address(es) associated with the NVMe-oF command(s), address fields for the SGL address(es) associated with the NVMe-oF command(s), a NVMe-oF data transfer command Identity Number, a QN (queue number, and/or a RDMA QP number (RDMA queue pair number). In an embodiment, the bridge unit 204 of the system 200 may be configured to execute a doorbell ring in the NVMe-SSD storage device 206. In an embodiment, the NVMe-SSD storage device 206 of the system 200 may be configured to initiate at least one of a PCIe memory READ TLP transaction to fetch SQE stored in the SQ buffer 204*e*. In an embodiment, the system 200 may be configured to initiate, by the NVMe-SSD storage device 206 at least one PCIe memory TLP transaction to access the virtual data memory 204*ba* associated with the NVMeoF-NVMe sub-module 204*b* via PCIe bus. In an embodiment, the bridge unit 204 of the system 200 may be configured to translate the PCIe TLP Transaction from the NVMe-SSD storage device 206 to a remote direct memory access (RDMA) WRITE packet or a RDMA READ packet via the NVMeoF-NVMe sub-module 204*b*. In an embodiment, the bridge unit 204 of the system 200 may be configured to dynamically initiate (e.g., transmit or otherwise convey) the translated RDMA packet to the NVMe-oF host unit 202 via fabric. In an embodiment, the bridge unit 204 of the system 200 may be configured to receive a completion queue entry (CQE) to the virtual completion queue (VCQ) address, via PCIe bus from the NVMe-SSD storage device 206, based on completion of writing the data or reading the data corresponding to the NVMe-oF data transfer command, by the NVMe-SSD storage device 206, by accessing the virtual data memory 204*ba* associated with the NVMeoF-NVMe sub-module 204*b*. In an embodiment, the bridge unit 204 of the system 200 may be configured to translate the PCIe TLP transaction corresponding to the CQE received from the NVMe-SSD storage device 206 to the RDMA SEND packet via the NVMeoF-NVMe sub-module 204*b*. In an embodiment, the bridge unit 204 of the system 200 may be configured to dynamically initiate (e.g., transmit or otherwise convey) the translated RDMA SEND packet to the NVMe-oF host unit 202 via fabric. In an embodiment, the bridge unit 204 of the system 200 may be configured to update a completion queue head doorbell (CQHD) in the NVMe-SSD storage device 206, by the NVMeoF-NVMe sub-module 204*b* associated with the bridge unit 204, based on the completion of the at least one action(s).

In an embodiment, the VCQ base address may be provided by the bridge unit 204 during the CREATE action corresponding to IOCQ command for the NVMe-SSD storage device 206. The VCQ base address includes the base address corresponding to the NVMeoF-NVMe sub-module 204*b* and a QN (queue number) corresponding to the completion queue (CQ). In an example, the virtual IOCQ address can be described as follows:

Virtual IOCQ Address={"Base address of NVMeoF-NVMe sub-module 204*b* in bridge unit 204", "Tag_bit (i.e. 1'b0)", "Queue_Number (i.e. [7:0], PCIe bus, PCIe device, PCIe function, 22'h0)"}

The tag bit field can be assigned with "0" for the VCQ address. In an embodiment, the NVMe-SSD storage device 206 may transmit the PCIe memory WRITE TLP for the CQE, for posting to the NVMeoF-NVMe sub-module 204*b*. Further, the NVMeoF-NVMe sub-module 204*b* may decode the QN (queue number) of the CQE from the stored VCQ base address. In an embodiment, the decoded QN (queue number) may be used by the NVMeoF-NVMe sub-module 204*b* to dynamically post the CQE to the NVMe-oF host unit 202 through the RDMA sub-module 204*a* using the RDMA SEND operation, over fabrics without buffering for CQE of the IO queue, in bridge unit 204.

In an embodiment, the virtual data memory address of the virtual data memory 204*ba* which is embedded by the NVMeoF-NVMe sub-module 204*b* in an SGL entry field such as an SGL address field of the stored SQE includes the base address and command token, corresponding to the NVMeoF-NVMe sub-module 204*b*. In an example, the virtual data buffer address can be described as follows:

Virtual data buffer Address={"Base address of NVMeoF-NVMe sub-module 204*b* in bridge unit 204", "Tag_bit (i.e. 1'b1)", "Command_Token (i.e. [7:0], 22'h0)"}

The tag can be "1" for the virtual data buffer address. In an embodiment, the context information such as the KEY fields for all the SGL address(es) associated with the NVMe-oF command(s), the address field(s) for all the SGL address(es) associated with the NVMe-oF command(s) and the RDMA QP number (RDMA queue pair number) may be stored in the context memory 204*bb* for each command received by the NVMeoF-NVMe sub-module 204*b*. The command token may be allocated by the NVMeoF-NVMe sub-module 204*b* for each command to reference the context information stored in the context memory 204*bb*. In an embodiment, the NVMe-SSD storage device 206 transmits the PCIe memory WRITE TLP transaction or the PCIe memory READ TLP transaction to the bridge unit 204 via PCIe bus, to access the virtual data memory 204*ba* via a read/write command. Accordingly, the NVMeoF-NVMe sub-module 204*b* may decode the command token number from the virtual data memory address of the virtual data memory 204*ba* after accessing the data buffer. In an embodiment the NVMeoF-NVMe sub-module 204*b* may use the context information stored in the context memory 204*bb* to translate the PCIe memory WRITE TLP transaction or the PCIe memory READ TLP transaction received via PCIe bus from the NVMe-SSD storage device 206 to RDMA WRITE packets or RDMA READ packets respectively. An RDMA WRITE packet is initiated to transfer data corresponding to the NVMe-oF data transfer command from the bridge unit 204 to the NVMe-oF host unit 202. An RDMA READ packet is initiated to transfer the data corresponding to the NVMe-oF data transfer command from the NVMe-oF host unit 202 to the bridge unit 204. As a result of the initiated data transfer, the context information stored in the context memory 204*bb* is used by the NVMeoF-NVMe sub-module 204*b* to translate at least one of the PCIe memory WRITE TLP transaction and the PCIe memory READ TLP transaction received via PCIe from the NVMe-SSD storage device 206, to at least one of a RDMA WRITE transaction and a RDMA READ transaction for transmission to the NVMe-oF host unit 202 over fabrics.

In an embodiment, a NVMe-oF WRITE command with in-capsule data may be received by the NVMeoF-NVMe sub-module 204*b*. The NVMeoF-NVMe sub-module 204*b* may not allocate the command token and may not store the context information stored in the context memory 204*bb*. In an example, the NVMeoF-NVMe sub-module 204*b* may update the SGL field of the command with an address as shown below;

SGL field address in command={"In-capsule Write_Buffer ADDR (i.e. [31:0])"}

The NVMeoF-NVMe sub-module 204*b* may write the SQE portion of the in-capsule command to the corresponding IOSQ in the SQ buffer 204*e*. Further, the NVMeoF-NVMe sub-module 204*b* may WRITE an in-capsule data portion corresponding to the in-capsule command in the in-capsule write data buffer 204*f*. The NVMe-SSD storage device 206 may READ the data directly from the in-capsule write buffer address, if the NVMeoF WRITE command is received along with in-capsule data.

The diagram of FIG. 2*a* illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Figure 2B:
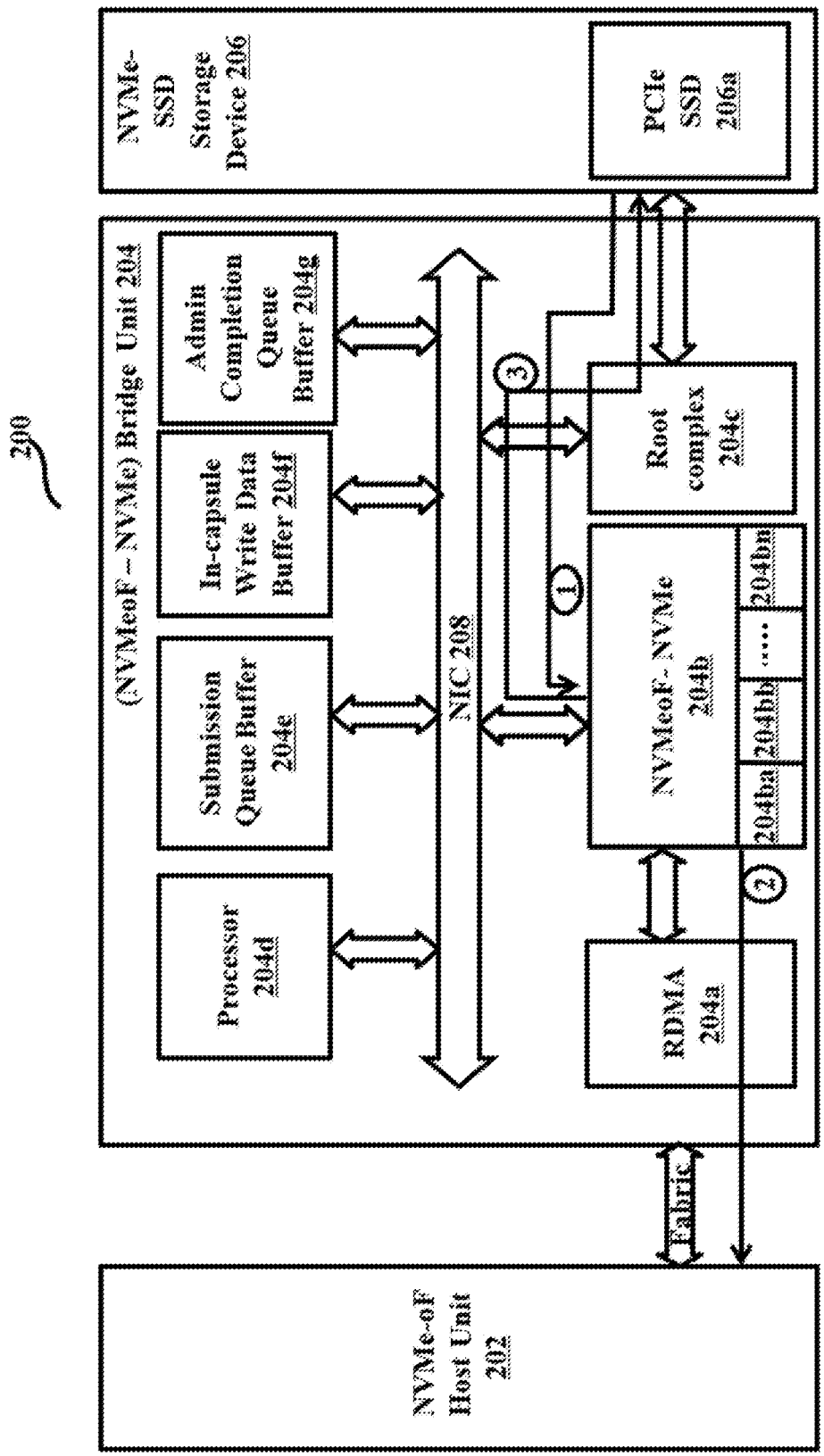
FIG. 2b illustrates a sequence diagram of input/output completion queue (IOCQ) flow in the architecture of a bridge unit according to embodiments as disclosed herein.

FIG. 2*b* illustrates a sequence diagram of input/output completion queue (IOCQ) flow in the architecture of a bridge unit 204 according to embodiments as disclosed herein. In an embodiment, at a first step, the NVMe-SSD storage device 206 may post the completion entry (CE) to the virtual completion queue (VCQ) area, over the PCIe bus. In an embodiment, the VCQ may be mapped to the NVMeoF-NVMe sub-module 204*b*. The NVMeoF-NVMe sub-module 204*b* may decode the address and may identify the QN (queue number), for which the completion may be targeted by the NVMe-SSD storage device 206. The NVMeoF-NVMe sub-module 204*b* may map the NVMe completion queue (CQ) to the RDMA QP number. At a second step, the NVMeoF-NVMe sub-module 204*b* may form the RDMA SEND command and the NVMe sub-module 204*b* may transmit the RDMA SEND command to the NVMe-oF host unit 202 over fabrics. At a third step, the NVMeoF-NVMe sub-module 204*b* may update the completion queue head doorbell (CQHD) in the NVMe-SSD storage device 206 via the PCIe bus. Further, the physical buffer may be allocated for the admin CQ in the ACQ buffer 204*g*, as the admin queue may be intended for management commands and intervention of the processor 204*d* may be required.

The Admin CQ flow can be as follows, at a first step, the NVMe-SSD storage device 206 may post the Completion Entry (CE) to the ACQ buffer 204*g*. At a second step, a Message Signal Interrupt (MSI-X) may be generated by the NVMe-SSD storage device 206 and the interrupt may be provided to the processor 204*d* of the bridge unit 204. At a third step, the processor 204*d* may identify the posted by the NVMe-SSD storage device 206 in the ACQ buffer 204*g*. Further, the processor 204*d* may also search the phase bit in the CE. At a fourth step, if required, the processor 204*d* may modify the CE in the ACQ buffer 204*g* of the bridge unit 204. At a fifth step, the processor 204*d* may indicate pending CE in the associated ACQ buffer 204*g*, to the NVMeoF-NVMe sub-module 204*b*. At a sixth step, the NVMeoF-NVMe sub-module 204*b* may fetch the Pending Completion Entry (PCE) from the ACQ buffer 204*g*. At a seventh step, the NVMeoF-NVMe sub-module 204*b* may generate an RDMA SEND packet via the RDMA sub-module and transmit the RDMA SEND packet to the NVMe-oF host unit 202. At an eighth step, the NVMeoF-NVMe sub-module 204*b* may update completion queue head doorbell (CQHD) in the NVMe-SSD storage device 206.

Figure 2C:
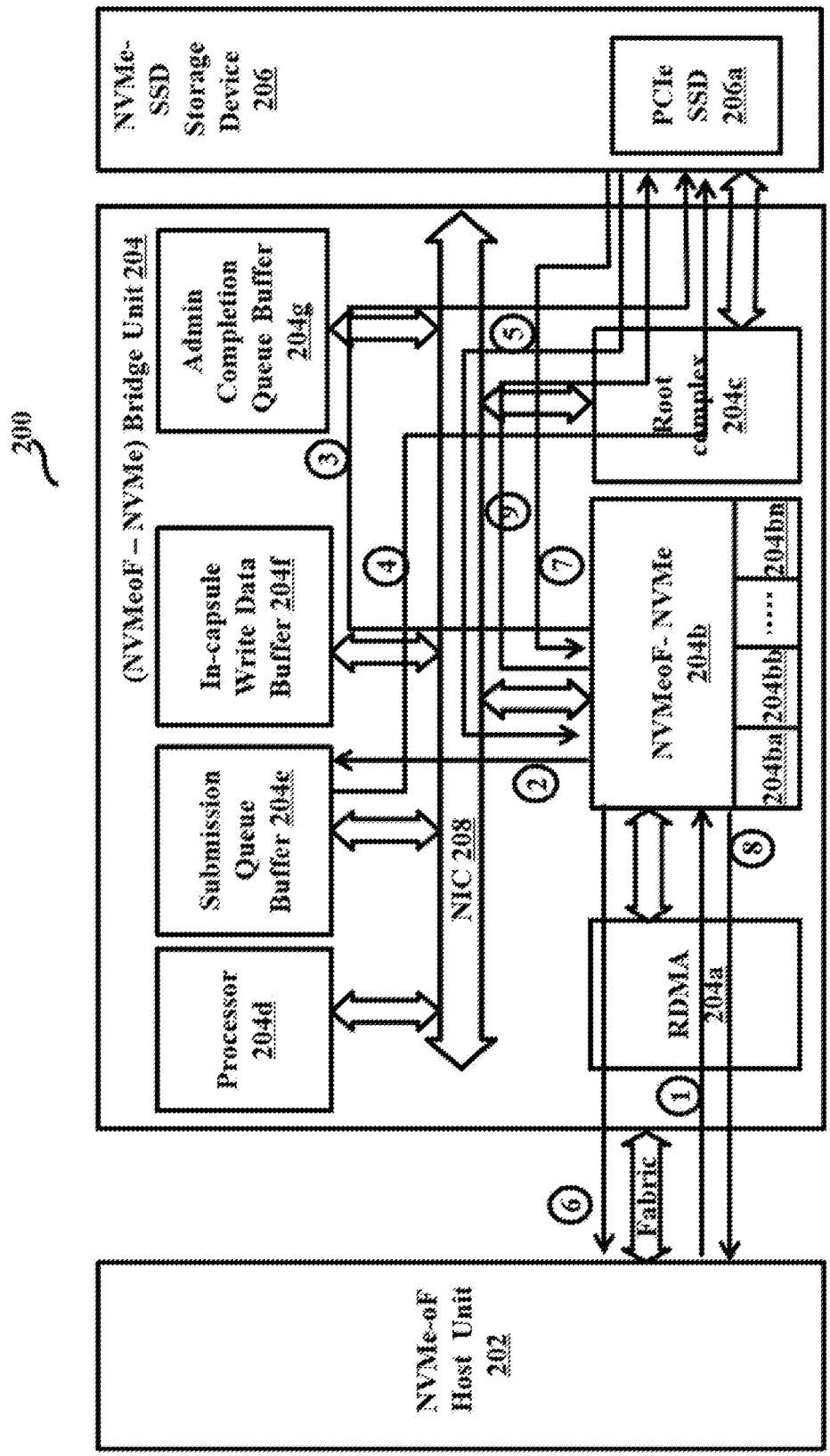
FIG. 2c illustrates a sequence diagram of NVMe-oF read flow in the architecture of a bridge unit according to embodiments as disclosed herein.

FIG. 2*c* illustrates a sequence diagram of NVMe-oF read flow in the architecture of a bridge unit 204 according to embodiments as disclosed herein.

At a first step, the NVMe-oF host unit 202 may transfer a NVMe READ command as an RDMA SEND packet to the bridge unit 204. The NVMe READ command can be a submission queue entry (SQE) corresponding to the IOSQ. At a second step, the NVMeoF-NVMe sub-module 204*b* may update the received SQE in the respective IOSQ associated with the SQ buffer 204*e* after updating the scattered gathered list (SGL) address to the virtual data memory address of the virtual data memory 204*ba*. Further, the NVMeoF-NVMe sub-module 204*b* may store the context information such as the QN (queue number) the NVMe-oF command ID, the Remote KEY (i.e. KEY fields for all the SGL address(es) associated with the NVMe-oF command(s)), and/or the address fields for all the SGL address(es) associated with the NVMe-oF command(s) of the NVMe-oF host unit 202.

At a third step, the NVMeoF-NVMe sub-module 204*b* may ring the submission queue tail doorbell (SQTD) of the NVMe-SSD storage device 206 via the PCIe bus. At a fourth step, the NVMe-SSD storage device 206 may fetch, via PCIe, the submission queue entry (SQE) stored in the SQ buffer 204*e*. At a fifth step, the NVMe-SSD storage device 206 may initiate (e.g., transmit or otherwise convey) a PCIe memory WRITE transaction layer packet (TLP) transaction to the virtual data memory 204*ba* that resides in the NVMeoF-NVMe sub-module 204*b*. At a sixth step, the NVMeoF-NVMe sub-module 204*b* may decode the command token associated with the NVMe READ command, from the virtual data memory address of the virtual data memory 204*ba*. The NVMeoF-NVMe sub-module 204*b* may extract the context information stored in the context memory 204*bb*, based on the command token associated with the NVMe READ command. The NVMeoF-NVMe sub-module 204*b* may form the RDMA WRITE packet, and the NVMeoF-NVMe sub-module 204*b* may transmit the RDMA WRITE packet to the NVMe-oF host unit 202 over fabrics. At a seventh step, the NVMe-SSD storage device 206 may post the Completion Entry (CE) in the Virtual CQ (VCQ) address, once the data transfer is completed to the virtual data memory address of the virtual data memory 204*ba*, for the NVMe READ command. At an eighth step, the NVMeoF-NVMe sub-module 204*b* may decode the QN (queue number) from the Virtual CQ (VCQ) address, and the NVMeoF-NVMe sub-module 204*b* may form the RDMA SEND packet to the corresponding RDMA QN to transmit the completion queue entry (CQE) to the NVMe-oF host unit 202 over fabrics. At a ninth step, the NVMeoF-NVMe sub-module 204*b* may update the completion queue dead doorbell (CQHD) in the NVMe-SSD storage device 206 via the PCIe bus.

Figure 2D:
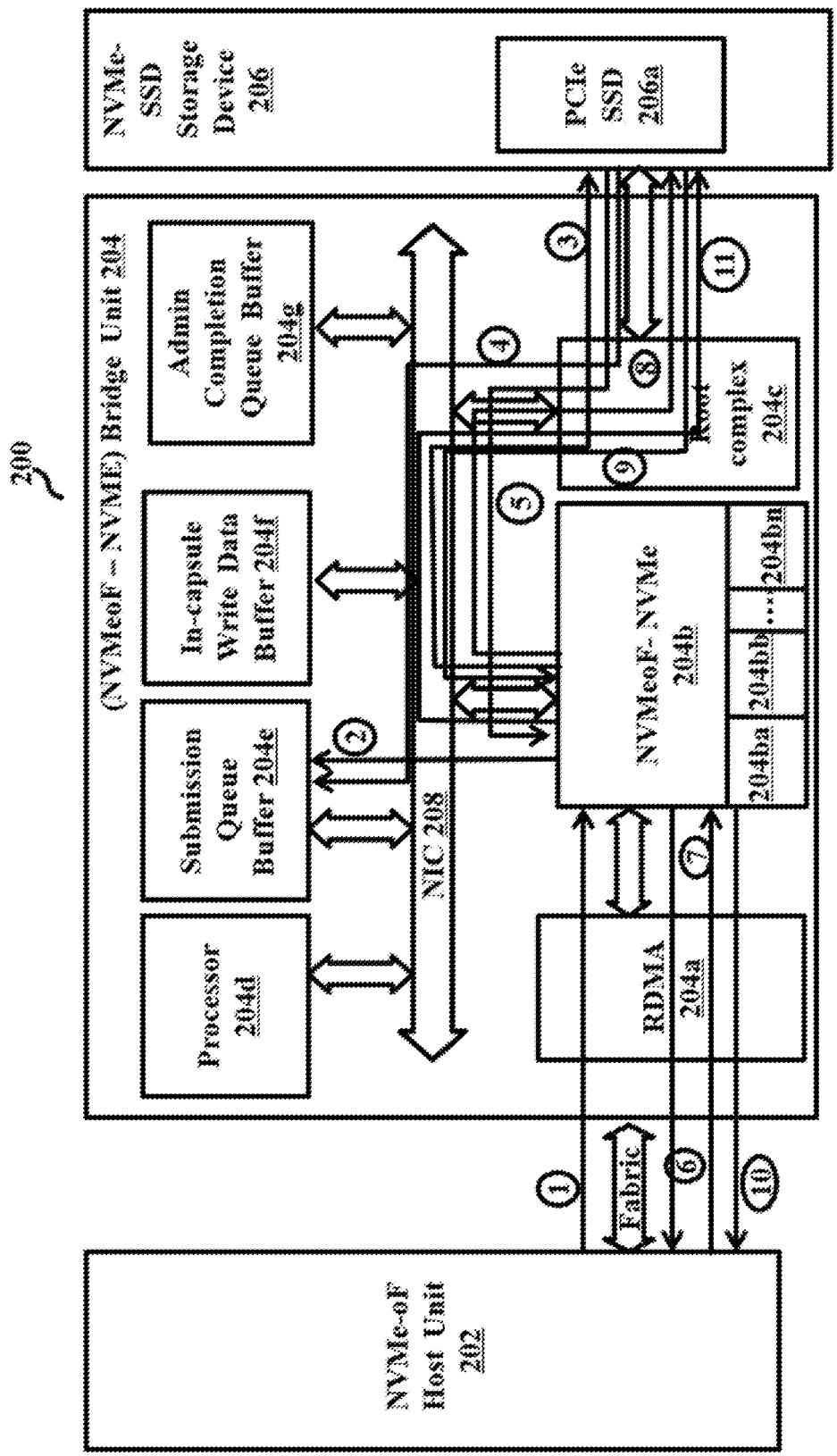
FIG. 2d illustrates a sequence diagram of NVMe-oF write flow in the architecture of a bridge unit according to embodiments as disclosed herein.

FIG. 2*d* illustrates a sequence diagram of the NVMe-oF WRITE flow in the architecture of a bridge unit 204 according to embodiments as disclosed herein.

At a first step, the NVMe-oF host unit 202 may transfer a NVMe WRITE command via a RDMA SEND packet to the bridge unit 204. The NVMe WRITE command can be transferred without the in-capsule data. At a second step, the NVMeoF-NVMe sub-module 204*b* may update the received SQE in the respective IOSQ associated with the SQ buffer 204*e*, after updating the scattered gathered list (SGL) address to the virtual data memory address of the virtual data memory 204*ba*. Further, the NVMeoF-NVMe sub-module 204*b* may store the context information such as QN (queue number) and NVMe-oF command ID, Remote KEY (i.e. KEY fields for all the SGL address(es) associated with the NVMe-oF command(s)), and/or the address fields for all the SGL address(es) associated with the NVMe-oF command(s) of the NVMe-oF host unit 202. At a third step, the NVMeoF-NVMe sub-module 204*b* may ring the submission queue tail doorbell (SQTD) of the NVMe-SSD storage device 206 via PCIe. At a fourth step, the NVMe-SSD storage device 206 may fetch the SQE from the SQ buffer 204*e* via PCIe. At a fifth step, the NVMe-SSD storage device 206 may initiate a PCIe memory READ TLP transaction corresponding to the virtual data memory address of the virtual data memory 204*ba*. At a sixth step, the NVMeoF-NVMe sub-module 204*b* may decode the command token from the virtual data memory address of the virtual data memory 204*ba* and extract the context information from the command token stored in the context memory 204*bb*. The NVMeoF-NVMe sub-module 204*b* may initiate the RDMA READ request. At a seventh step, the NVMe-oF host unit 202 may respond to the read request over fabrics, along with or including by sending a RDMA READ response.

At an eighth step, the NVMeoF-NVMe sub-module 204*b* may translate the RDMA READ response to PCIe memory READ completion TLP and may transmit the translated PCIe memory READ completion TLP to the NVMe-SSD storage device 206 via the PCIe bus. At a ninth step, the NVMe-SSD storage device 206 may post the completion entry to the virtual CQ address of bridge unit 204, when the complete data corresponding to the WRITE command is read by the NVMe-SSD storage device 206 from the virtual memory address of the virtual data memory 204*ba*. At a tenth step, the NVMeoF-NVMe sub-module 204*b* may decode the RDMA QN (queue number) from the virtual CQ address, and the NVMeoF-NVMe sub-module 204*b* may form the RDMA SEND packet to the corresponding RDMA QN for transmitting the CQE to the NVMe-oF host unit 202 over fabrics. At an eleventh step, the NVMeoF-NVMe sub-module 204*b* may update the CQHD in the NVMe-SSD storage device 206 via the PCIe bus.

Figure 3A:
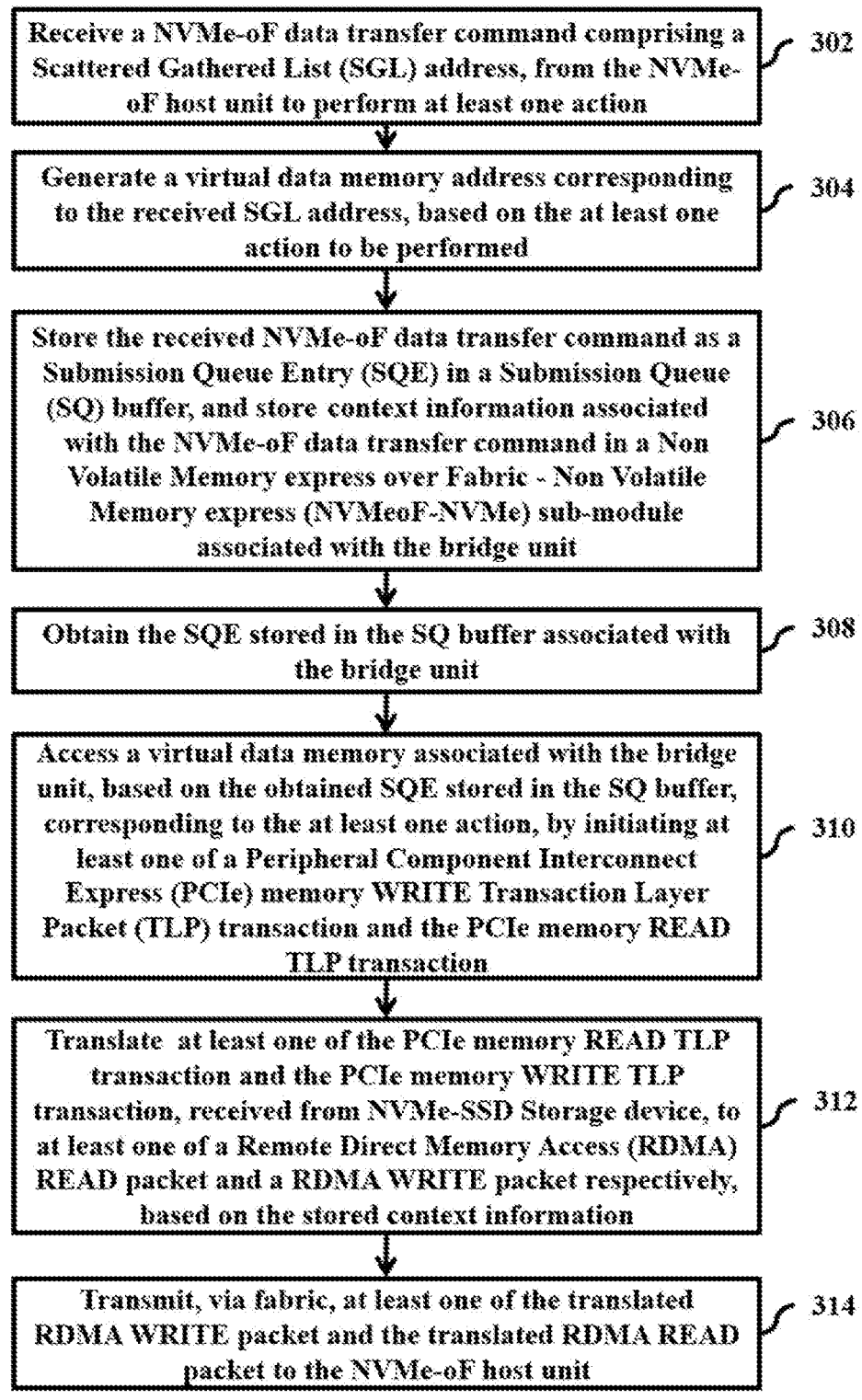
FIG. 3a is a flow chart illustrating a method for managing communication between a NVMe-oF host unit and multiple NVMe-SSD storage devices via a bridge unit according to embodiments as disclosed herein.

FIG. 3*a* is a flow chart illustrating a method 300*a* for managing communication between the NVMe-oF host unit 202 and the NVMe-SSD storage devices 206 via the bridge unit 204 according to embodiments as disclosed herein.

At step 302, the method 300*a* includes receiving, by the bridge unit, the NVMe-oF data transfer command comprising a scattered gathered list (SGL) address, from the NVMe-oF host unit to perform at least one action. At step 304, the method 300*a* includes generating, by the bridge unit, a virtual data memory address of the virtual data memory, corresponding to the received SGL address, based on the at least one action to be performed. At step 306, the method 300*a* includes storing, by the bridge unit, the received NVMe-oF data transfer command as a submission queue entry (SQE) in a submission queue (SQ) buffer and storing context information associated with the NVMe-oF data transfer command in a context memory of the NVMeoF-NVMe sub-module associated with the bridge unit. At step 308, the method 300*a* includes obtaining, by the NVMe-SSD storage device, the SQE stored in the SQ buffer associated with the bridge unit. At step 310, the method 300*a* includes accessing, by the NVMe-SSD storage device, the virtual data memory associated with the bridge unit, based on the SQE obtained from the SQ buffer, corresponding to the at least one action, by initiating at least one of a PCIe memory WRITE transaction layer packet (TLP) transaction and the PCIe memory READ TLP transaction. At step 312, the method 300*a* includes translating, by the bridge unit, at least one of the PCIe memory READ TLP transaction and the PCIe memory WRITE TLP transaction, received from the NVMe-SSD Storage device, to at least one of a remote direct memory access (RDMA) READ packet and a RDMA WRITE packet respectively, based on the context information stored in the context memory. At step 314, the method 300*a* includes transmitting, by the bridge unit via fabric, at least one of the translated RDMA WRITE packet and the translated RDMA READ packet to the NVMe-oF host unit.

The various actions in method 300*a* may be performed in the order presented, in a different order or simultaneously. Further, in some embodiments, some actions listed in FIG. 3*a* may be omitted.

Figure 3B:
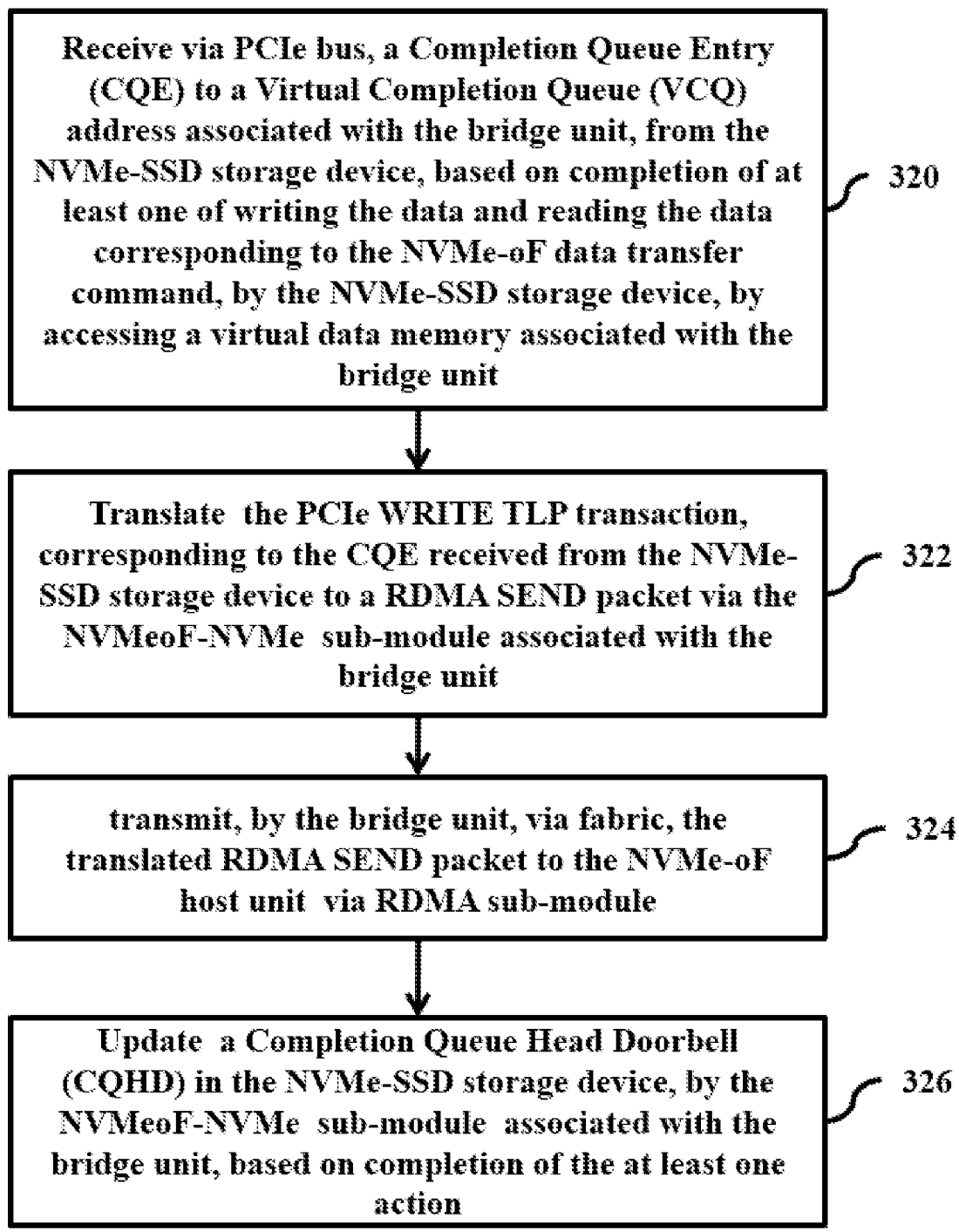
FIG. 3b is a flow chart illustrating a method for transmitting the translated RDMA SEND packet to the NVMe-oF host unit according to embodiments as disclosed herein.

FIG. 3*b* is a flow chart illustrating a method 300*b* for transmitting the translated RDMA SEND packet to the NVMe-oF host unit 202 according to embodiments as disclosed herein.

At step 320, the method 300*b* includes receiving, by the bridge unit from the NVMe-SSD storage device via the PCIe bus, a completion queue entry (CQE) to a virtual completion queue (VCQ) address associated with the bridge unit, based on completion of at least one of writing the data and reading the data corresponding to the NVMe-oF data transfer command, by the NVMe-SSD storage device, by accessing the virtual data memory associated with the bridge unit. At step 322, the method 300*b* includes translating, by the bridge unit, the PCIe memory WRITE TLP transaction, corresponding to the CQE received from the NVMe-SSD storage device to a RDMA SEND packet via the NVMeoF-NVMe sub-module associated with the bridge unit. At step 324, the method 300*b* includes transmitting, by the bridge unit via fabric, the translated RDMA SEND packet to the NVMe-oF host unit via an RDMA sub-module. At step 326, the method 300b includes updating, by the NVMeoF-NVMe sub module of the bridge unit, a completion queue head doorbell (CQHD) in the NVMe-SSD storage device, based on completion of the at least one action.

The various actions in method 300b may be performed in the order presented, in a different order or simultaneously. Further, in some embodiments, some actions listed in FIG. 3b may be omitted.

Figure 3C:
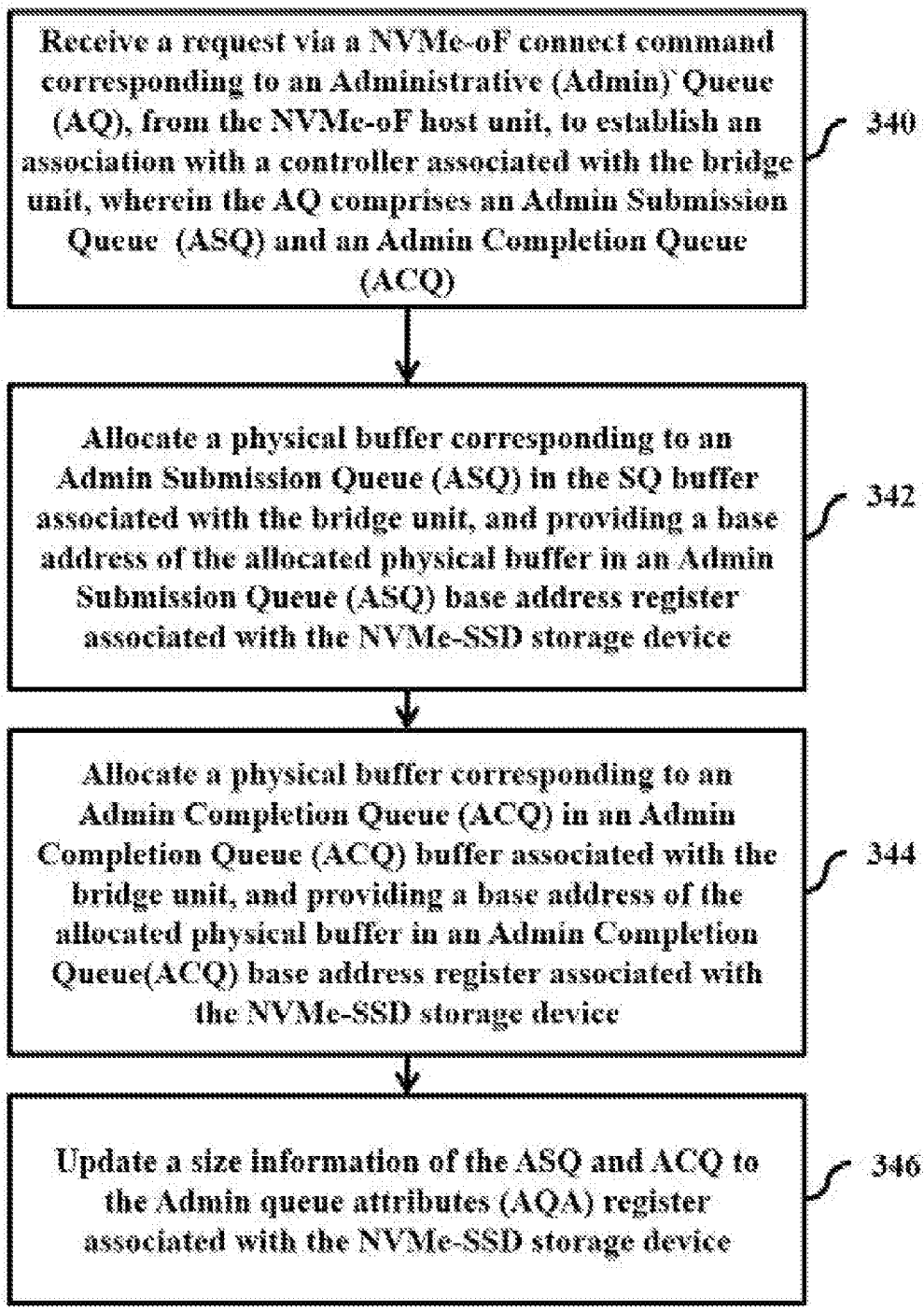
FIG. 3c is a flow chart illustrating a method for allocating, by the bridge unit, the physical buffer corresponding to an admin completion queue (ACQ) in an admin completion queue (ACQ) buffer according to embodiments as disclosed herein.

FIG. 3c is a flow chart illustrating a method 300c for allocating, by the bridge unit 204, the physical buffer corresponding to an admin completion queue (ACQ) in an admin completion queue (ACQ) buffer according to embodiments as disclosed herein.

At step 340, the method 300c includes receiving, by the bridge unit, a request via a NVMe-oF connect command corresponding to an administrative (Admin) queue (AQ), from the NVMe-oF host unit, to establish an association with a controller associated with the bridge unit. The AQ comprises an admin submission queue (ASQ) and an admin completion queue (ACQ). At step 342, the method 300c includes allocating, by the bridge unit, a physical buffer corresponding to an admin submission queue (ASQ) in the SQ buffer associated with the bridge unit and providing a base address of the allocated physical buffer in an ASQ base address register (admin submission queue base address register) associated with the NVMe-SSD storage device. At step 344, the method 300c includes allocating, by the bridge unit, a physical buffer corresponding to an admin completion queue (ACQ) in an admin completion queue (ACQ) buffer associated with the bridge unit and providing a base address of the allocated physical buffer in an ACQ base address register (admin completion queue base address register) associated with the NVMe-SSD storage device. At step 346, the method 300c includes updating, by the bridge unit, a size information of the ASQ and ACQ to the admin queue attributes (AQA) register associated with the NVMe-SSD storage device.

The various actions in method 300c may be performed in the order presented, in a different order or simultaneously. Further, in some embodiments, some actions listed in FIG. 3c may be omitted.

Figure 3D:
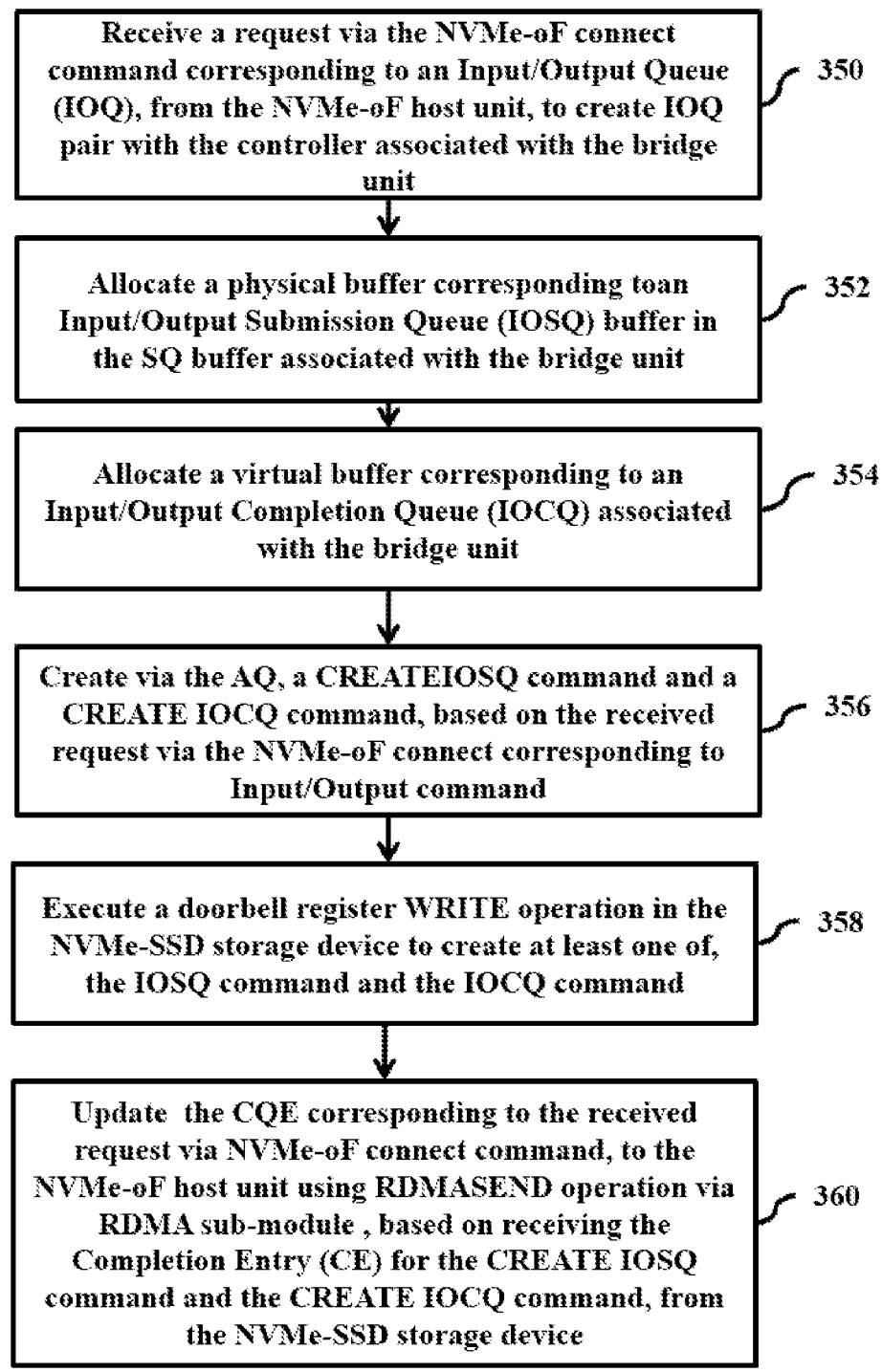
FIG. 3d is flow chart illustrating a method for allocating, by the bridge unit, a virtual buffer corresponding to an input/output completion queue (IOCQ) according to embodiments as disclosed herein.

FIG. 3d is flow chart illustrating a method 300d for allocating, by the bridge unit 204, a virtual buffer corresponding to an input/output completion queue (IOCQ) associated with the bridge unit according to embodiments as disclosed herein.

At step 350, the method 300d includes receiving, by the bridge unit, a request via the NVMe-oF connect command corresponding to an input/output queue (IOQ), from the NVMe-oF host unit, to create an IOQ pair with the controller associated with the bridge unit. At step 352, the method 300d includes allocating, by the bridge unit, a physical buffer corresponding to an IOSQ buffer in the SQ buffer associated with the bridge unit. The base address of the allocated physical buffer corresponding to the IOSQ buffer is embedded in the SQ base address field of the SQE in an IOSQ command. At step 354, the method 300d includes allocating, by the bridge unit, a virtual buffer corresponding to an input/output completion queue (IOCQ) associated with the bridge unit. In an embodiment, the base address of the allocated virtual buffer corresponding to the IOCQ buffer is embedded in the CQ base address field of SQE in the CREATE IOCQ command. At step 356, the method 300d includes creating, by the bridge unit via the AQ, a CREATE IOSQ command and a CREATE IOCQ command, based on the received request via the NVMe-oF connect corresponding to input/output command. At step 358, the method 300d includes executing, by the bridge unit, a doorbell register WRITE operation in the NVMe-SSD storage device to create at least one of the IOSQ command and the IOCQ command. At step 360, the method 300d includes updating, by the bridge unit, the CQE corresponding to the received request via NVMe-oF connect command, to the NVMe-oF host unit using RDMA SEND operation via a RDMA sub-module, based on receiving the Completion Entry (CE) for the CREATE IOSQ command and the CREATE IOCQ command, from the NVMe-SSD storage device.

The various actions in method 300d may be performed in the order presented, in a different order or simultaneously. Further, in some embodiments, some actions listed in FIG. 3d may be omitted.

Figure 3E:
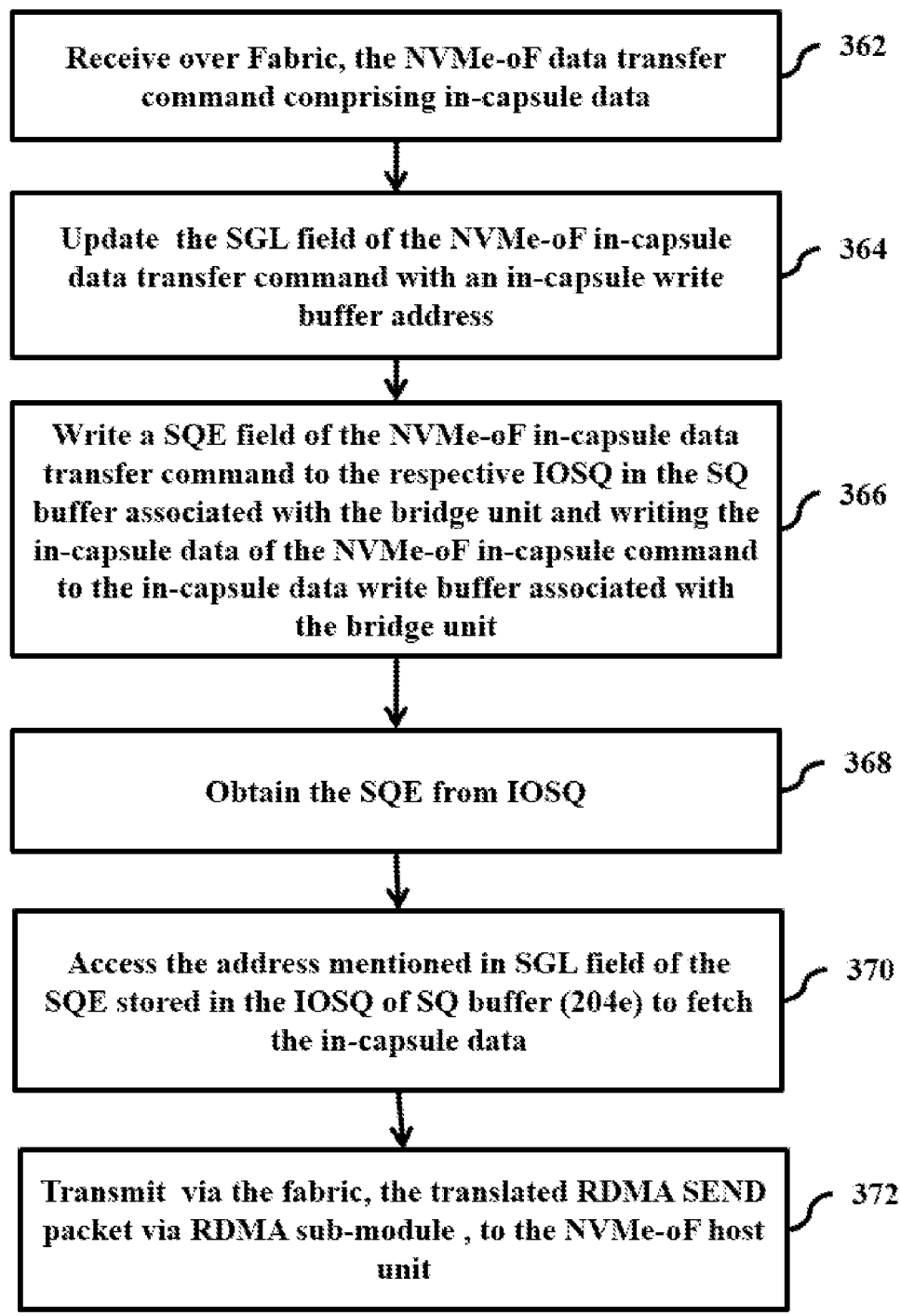
FIG. 3e is a flow chart illustrating a method for transmitting, by a bridge unit to an NVMe-oF host unit, a translated RDMA SEND packet via an RDMA sub-module according to embodiments as disclosed herein.

FIG. 3e is a flow chart illustrating a method 300e for transmitting, by the bridge unit 204, the translated RDMA SEND packet via a RDMA sub-module 204a, to the NVMe-oF host unit 202 according to embodiments as disclosed herein.

At step 362, the method 300e includes, receiving, by the bridge unit over fabric, the NVMe-oF data transfer command comprising in-capsule data. At step 364, the method 300e includes updating, by the bridge unit, the SGL field of the NVMe-oF in-capsule data transfer command with an in-capsule write buffer address. At step 366, the method 300e includes writing, by the bridge unit, a SQE field of the NVMe-oF in-capsule data transfer command to the respective IOSQ in the SQ buffer associated with the bridge unit, and writing the in-capsule data of the NVMe-oF in-capsule command to the in-capsule data write buffer associated with the bridge unit and updating the SQ tail doorbell to the NVMe-SSD storage device. At step 368, the method 300e includes obtaining, by the NVMe-SSD storage device, the SQE from the IOSQ of the SQ buffer associated with the bridge unit. At step 370, the method 300e includes accessing, by the NVMe-SSD storage device, the address mentioned in the SGL field of the SQE stored in the IOSQ of SQ buffer to fetch the in-capsule data from the in-capsule data write buffer of bridge unit 204. At step 372, the method 300e includes transmitting, by the bridge unit via fabric, the translated RDMA SEND packet via RDMA sub-module, to the NVMe-oF host unit.

The various actions in method 300e may be performed in the order presented, in a different order or simultaneously. Further, in some embodiments, some actions listed in FIG. 3e may be omitted.

Advantageously, the bridge unit 204 may allow buffer reduction, reduction in power consumption, and reduction in area/cost. The bridge unit 204 may also save one memory copy operation, hence providing the reduction in the latency in one aspect though latency may be comparatively reduced in multiple ways using the teachings herein in comparison the conventional bridge unit.

The bridge unit 204 may provide complete hardware automation in an I/O path. The bridge unit 204 may not require processor intervention (e.g. SQE posting to CQHD posting is performed by hardware). Further, the bridge unit 204 may not require power loss protection. Furthermore, the NVMe driver may not require an operating system (OS). Also, the fetching of SGL addresses may be avoided by increasing MPS value and using PRP, which may avoid utilization of PCIe bandwidth for SGL Fetch.

The embodiments disclosed herein can be implemented through at least one software program running on at least one hardware device and performing network management functions to control the elements. The elements shown in FIG. 2a are at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for managing communication between a NVMe-oF host unit (non-volatile memory express-over fabric host unit) and a plurality of NVMe-SSD storage devices (non-volatile memory express-solid state drive storage devices) via a bridge unit, the method comprising:
receiving, by the bridge unit, a NVMe-oF data transfer command comprising an SGL address (scattered gathered list address), from the NVMe-oF host unit to perform at least one action;
generating, by the bridge unit, a virtual data memory address of a virtual data memory, corresponding to the SGL address, based on the at least one action to be performed, wherein the virtual data memory corresponds to a physical memory in the bridge unit;
storing, by the bridge unit, the NVMe-oF data transfer command as an SQE (submission queue entry) in a SQ buffer (submission queue buffer), and storing context information associated with the NVMe-oF data transfer command in a context memory in a NVMeoF-NVMe sub-module;
obtaining, by a NVMe-SSD storage device among the plurality of NVMe-SSD storage devices, the SQE stored in the SQ buffer;
accessing, by the NVMe-SSD storage device, the virtual data memory corresponding to the physical memory in the bridge unit, based on the SQE obtained from the SQ buffer by initiating at least one of a PCIe (peripheral component interconnect express) memory READ TLP transaction (transaction layer packet transaction) and a PCIe memory WRITE TLP transaction;
translating, by the bridge unit, the at least one of the PCIe memory READ TLP transaction and the PCIe memory WRITE TLP transaction, received from the NVMe-SSD Storage device, to one of a RDMA READ packet (remote direct memory access READ packet) and a RDMA WRITE packet, based on the context information stored in the context memory;
transmitting, by the bridge unit, via fabric to the NVMe-oF host unit, at least one of the RDMA READ packet translated by the bridge unit and the RDMA WRITE packet translated by the bridge unit,
receiving, by the bridge unit from the NVMe-oF host unit, a request via a NVMe-oF connect command corresponding to an AQ (administrative queue), to establish an association with a controller, wherein the AQ comprises an ASQ (admin submission queue) and an ACQ (admin completion queue);
allocating, by the bridge unit, a physical buffer corresponding to the ASQ, in the SQ buffer, and providing a base address of the physical buffer corresponding to the ASQ in an ASQ base address register associated with the NVMe-SSD storage device;
allocating, by the bridge unit, a physical buffer corresponding to the ACQ in an ACQ buffer, and providing a base address of the physical buffer corresponding to the ACQ in an ACQ base address register associated with the NVMe-SSD storage device; and
updating, by the bridge unit, a size information of the ASQ and ACQ to an AQA register (admin queue attributes register) associated with the NVMe-SSD storage device.

2. The method as claimed in claim 1, further comprising:
receiving, by the bridge unit from the NVMe-SSD storage device via a PCIe bus, a CQE (completion queue entry) corresponding to the PCIe memory WRITE TLP transaction for a VCQ address (virtual completion queue address), based on completion of at least one of writing the data and reading the data corresponding to the NVMe-oF data transfer command by the NVMe-SSD storage device by accessing the virtual data memory corresponding to the physical memory in the bridge unit;
translating, by the bridge unit, the PCIe memory WRITE TLP transaction to a RDMA SEND packet via the NVMeoF-NVMe sub-module;
transmitting, by the bridge unit via fabric to the NVMe-oF host unit, the RDMA SEND packet translated by the bridge unit via an RDMA sub-module; and
updating, by the bridge unit, a completion queue head doorbell (CQHD) in the NVMe-SSD storage device, by the NVMeoF-NVMe sub-module, based on completion of the at least one action.

3. The method as claimed in claim 1, further comprising:
receiving, by the bridge unit from the NVMe-oF host unit, a request via an NVMe-oF connect command corresponding to an input/output queue (IOQ), to create an IOQ pair with a controller;
allocating, by the bridge unit, a physical buffer corresponding to an IOSQ buffer (input/output submission queue buffer) in the SQ buffer, wherein a base address of the physical buffer corresponding to the IOSQ buffer is embedded in an SQ base address field of the SQE in an IOSQ command;
allocating, by the bridge unit, a virtual buffer corresponding to an IOCQ buffer (input/output completion queue buffer), wherein a base address of the virtual buffer corresponding to the IOCQ buffer is embedded in a CQ base address field of the SQE in an IOCQ command;
creating, by the bridge unit, via an AQ (administrative queue), a CREATE IOSQ command and a CREATE IOCQ command, based on the request via the NVMe-oF connect command;
executing, by the bridge unit, a doorbell register WRITE operation in the NVMe-SSD storage device to create at least one of the IOSQ command and the IOCQ command; and
updating, by the bridge unit, a completion queue entry (CQE) corresponding to the request via the NVMe-oF connect command, to the NVMe-oF host unit using an RDMA SEND operation via an RDMA sub-module, based on receiving a Completion Entry (CE) for the CREATE IOSQ command and the CREATE IOCQ command, from the NVMe-SSD storage device.

4. The method as claimed in claim 3, wherein the base address of the physical buffer is embedded in a base address field of the IOSQ command and the base address of the virtual buffer is embedded in a base address field of the CREATE IOCQ command.

5. The method as claimed in claim 1, further comprising:
receiving, by the bridge unit over fabric, the NVMe-oF data transfer command comprising in-capsule data;
updating, by the bridge unit, an SGL field of the NVMe-oF data transfer command with an in-capsule write data buffer address;
writing, by the bridge unit, an SQE field of the NVMe-oF data transfer command to an IOSQ (input/output submission queue) in the SQ buffer, writing the in-capsule data of the NVMe-oF data transfer command to an in-capsule write buffer and updating an SQ tail doorbell to the NVMe-SSD storage device;
obtaining, by the NVMe-SSD storage device, the SQE from the IOSQ in the SQ buffer;
accessing, by the NVMe-SSD storage device, the in-capsule write data buffer address in the SGL field to fetch the in-capsule data from the in-capsule write buffer of the bridge unit; and
transmitting, via an RDMA sub-module of the bridge unit via fabric to the NVMe-oF host, an RDMA SEND packet translated by the bridge unit.

6. The method as claimed in claim 1, wherein receiving the NVMe-oF data transfer command comprising the SGL address from the NVMe-oF host unit comprises transmitting an RDMA_SEND command via an RDMA sub-module, to the NVMeoF-NVMe sub-module.

7. The method as claimed in claim 1, wherein the context information stored in the context memory is used by the NVMeoF-NVMe sub-module to translate at least one of the PCIe memory WRITE TLP transaction and the PCIe memory READ TLP transaction received via PCIe from the NVMe-SSD storage device, to the one of a RDMA WRITE transaction and a RDMA READ transaction, for transmission to the NVMe-oF host unit over fabric.

8. The method as claimed in claim 1, wherein the RDMA WRITE packet translated by the bridge unit is initiated to transfer data corresponding to the NVMe-oF data transfer command from the bridge unit to the NVMe-oF host unit, and the RDMA READ packet is initiated to transfer the data corresponding to the NVMe-oF data transfer command from the NVMe-oF host unit to the bridge unit.

9. A system for managing communication between a NVMe-oF host unit (non-volatile memory express-over fabric (NVMe-oF host unit) and a plurality of NVMe-SSD storage devices (non-volatile memory express-solid state drive storage devices) via a bridge unit, the system being configured to:
receive, by the bridge unit, a NVMe-oF data transfer command comprising an SGL address (scattered gathered list address), from the NVMe-oF host unit to perform at least one action;
generate, by the bridge unit, a virtual data memory address of a virtual data memory, corresponding to the SGL address, based on the at least one action to be performed, wherein the virtual data memory corresponds to a physical memory in the bridge unit;
store, by the bridge unit, the NVMe-oF data transfer command as an SQE (submission queue entry in a SQ buffer (submission queue buffer), and store context information associated with the NVMe-oF data transfer command in a context memory in a NVMeoF-NVMe sub-module;

obtain, by a NVMe-SSD storage device among the plurality of NVMe-SSD storage devices, the SQE stored in the SQ buffer;
access, by the NVMe-SSD storage device, the virtual data memory corresponding to the physical memory in the bridge unit, based on the SQE obtained from the SQ buffer by initiating at least one of a PCIe (peripheral component interconnect express) memory READ TLP transaction (transaction layer packet transaction) and a PCIe memory WRITE TLP transaction;
translate, by the bridge unit, the at least one of the PCIe memory READ TLP transaction and the PCIe memory WRITE TLP transaction, received from the NVMe-SSD storage device, to one of a RDMA READ packet (remote direct memory access READ packet) and a RDMA WRITE packet, based on the context information stored in the context memory; and
transmit, by the bridge unit via fabric to the NVMe-oF host unit, at least one of the RDMA READ packet translated by the bridge unit and the RDMA WRITE packet translated by the bridge unit,
wherein the virtual data memory address of the virtual data memory corresponding to the physical memory in the bridge unit is embedded in an SGL address field of the SQE and comprises a base address and a command token corresponding to the NVMeoF-NVMe sub-module.

10. The system as claimed in claim 9, wherein in obtaining the SQE by the NVMe-SSD storage device, the system is configured to:
execute, by the bridge unit, a doorbell register WRITE operation in the NVMe-SSD storage device; and
obtain, by the NVMe-SSD storage device, the SQE stored in the SQ buffer, in response to the doorbell register WRITE operation, by initiating a PCIe memory READ TLP transaction via a PCIe bus.

11. The system as claimed in claim 9, wherein the system is further configured to:
obtain in-capsule data from an in-capsule write buffer address;
execute, by the bridge unit via a PCIe bus, a doorbell register WRITE operation in the NVMe-SSD storage device; and
obtain, by the NVMe-SSD storage device, the SQE stored in the SQ buffer, in response to the doorbell register WRITE operation.

12. The system as claimed in claim 9, wherein the system is further configured to:
receive, by the bridge unit via a PCIe bus, a completion queue entry (CQE) from the NVMe-SSD storage device;
translate, by the bridge unit, the PCIe TLP transaction associated with the CQE, to an RDMA SEND packet via the NVMeoF-NVMe sub-module;
transmit, by the bridge unit via fabric to the NVMe-OF host unit, the RDMA SEND packet translated by the bridge unit via an RDMA sub-module; and
update, by the NVMeoF-NVMe sub-module of the bridge unit, a CQHD (completion queue head doorbell) in the NVMe-SSD storage device, based on completion of the at least one action.

13. The system as claimed in claim 9, wherein the command token is allocated by the NVMeoF-NVMe sub-module for each command to reference the context information stored in the context memory.

14. The system as claimed in claim 9, wherein the virtual data memory corresponding to the physical memory in the bridge unit resides in a NVMeoF-NVMe sub-module of the bridge unit.

15. The system as claimed in claim 9, wherein the NVMe-oF data transfer command comprising the SGL address is received from the NVMe-oF host unit as an in-capsule command, and the in-capsule command is stored as a submission queue entry (SQE) in a submission queue (SQ) buffer.

16. The system as claimed in claim 9, wherein the context information stored in the context memory is retrieved by the NVMeoF-NVMe sub-module, if the NVMe-SSD storage device is accessing the virtual data memory corresponding to the physical memory in the bridge unit to perform at least one transaction.

17. The system as claimed in claim 9, wherein the context information stored in the context memory comprises at least one of a Remote KEY, a KEY field for the SGL address associated with the NVMe-oF data transfer command, an address field for the SGL address associated with the NVMe-oF command, a NVMe-oF data transfer command identity (ID) number, a QN (queue number), and a RDMA Queue Pair number.

18. The system as claimed in claim 9, wherein the PCIe memory WRITE TLP transaction corresponds to a completion queue entry (CQE) received from the NVMe-SSD storage device and comprises decoding by the NVMeoF-NVMe sub-module, a QN (queue number) of the CQE from an address field of the PCIe memory WRITE TLP transaction.

\* \* \* \* \*